United States Patent [19]

Alexander

[11] Patent Number: 4,647,914
[45] Date of Patent: Mar. 3, 1987

[54] SECURITY APPARATUS AND SYSTEM

[75] Inventor: Thomas T. Alexander, Columbus, Ohio

[73] Assignee: Mitsubishi Electric America, Inc., New York, N.Y.

[21] Appl. No.: 633,132

[22] Filed: Jul. 20, 1984

[51] Int. Cl.$^4$ .................... G08B 1/08; H04M 11/04
[52] U.S. Cl. .................... 379/44; 340/506; 340/514; 340/525; 340/528; 340/531; 340/534; 340/539; 379/49
[58] Field of Search ............ 340/539, 500, 505, 506, 340/524, 525, 527, 528, 531, 538, 825.72, 534, 825.69, 825.06, 696, 514; 179/5 R, 5 P

[56] References Cited

U.S. PATENT DOCUMENTS

| | | | |
|---|---|---|---|
| 3,914,692 | 10/1975 | Seaborn, Jr. | 340/539 |
| 3,925,763 | 12/1975 | Wadhwani et al. | 340/539 |
| 3,978,478 | 8/1976 | Schmitz | 340/528 |
| 4,092,643 | 5/1978 | Stolarczyk | 340/539 |
| 4,257,038 | 3/1981 | Rounds et al. | 340/539 |
| 4,360,801 | 11/1982 | Duhame | 340/696 |
| 4,523,184 | 6/1985 | Abel | 340/539 |

Primary Examiner—Donnie L. Crosland
Attorney, Agent, or Firm—Pennie & Edmonds

[57] ABSTRACT

A user friendly security apparatus and system for use in the home or small business. A logic architecture is provided which permits the monitoring of not only intrusion but also fire, special emergencies, low battery conditions or flooding utility power failure and the like. Positions to be secured with the system are monitored by small R. F. transmitters of restricted range as well as by hand held transmitters which are used for emergency conditions and the like. A transponder is provided for mounting within the home or business in the form of a console which responds to transmitted signals as well as to a silent hold-up switch fixed thereto to carry out automatic telephone dialing to a central security monitoring service. The transponder operates in an armed or idle operational mode and includes a test feature for use in the idle mode as well as a reset feature for that mode. An armed operational mode is provided for intrusion conditions and operates in conjunction with a key actuated arm switch which must be utilized in conjunction with the detection of intrusion.

19 Claims, 23 Drawing Figures

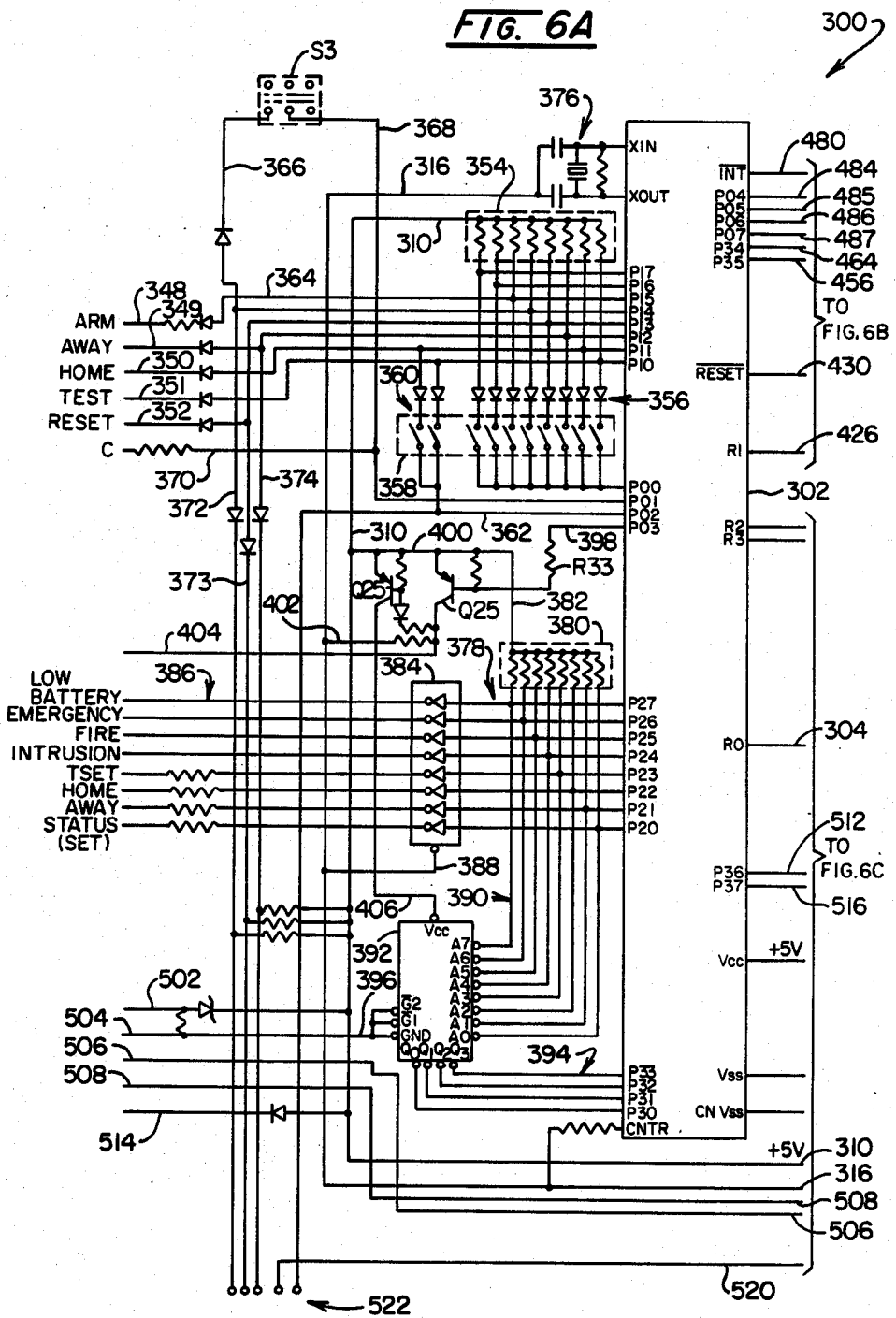

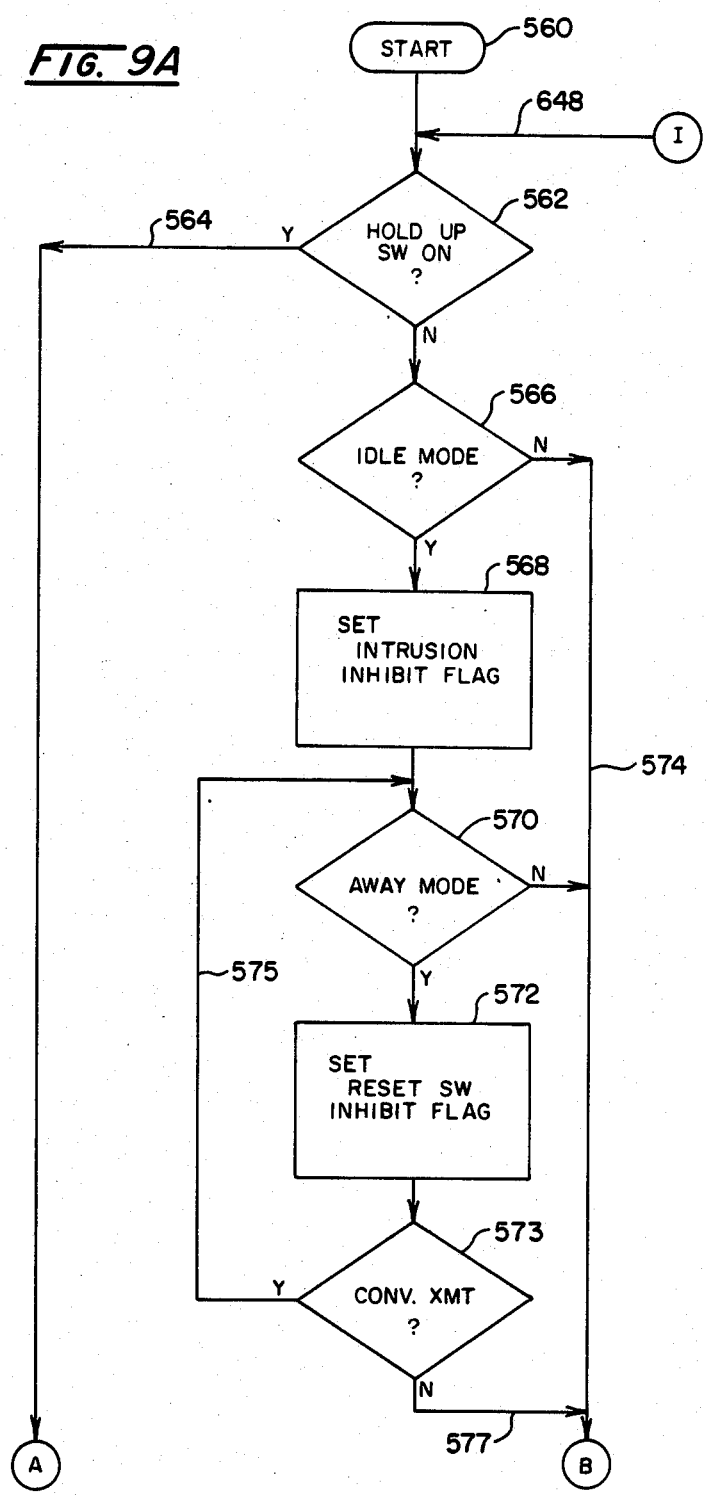

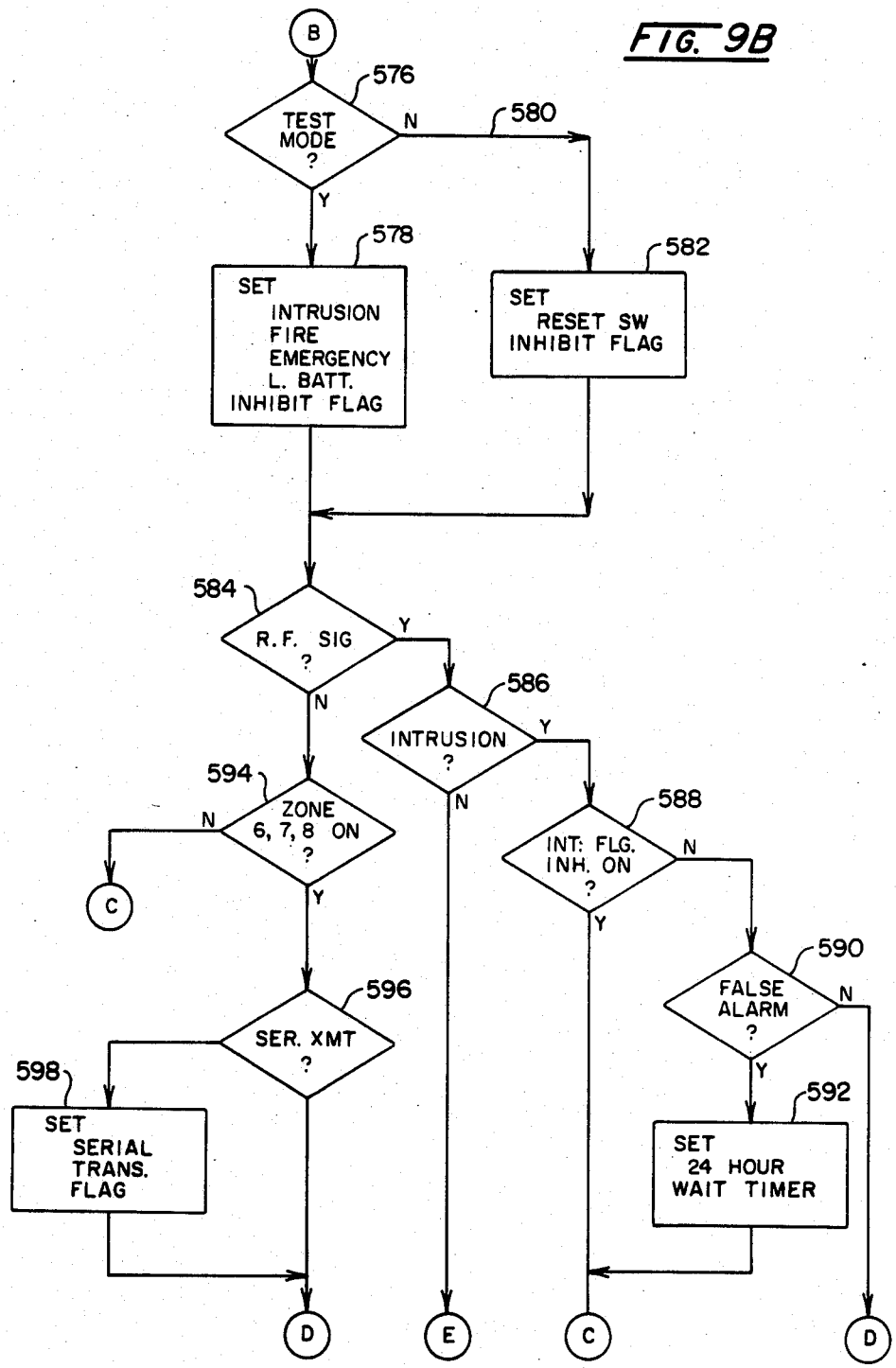

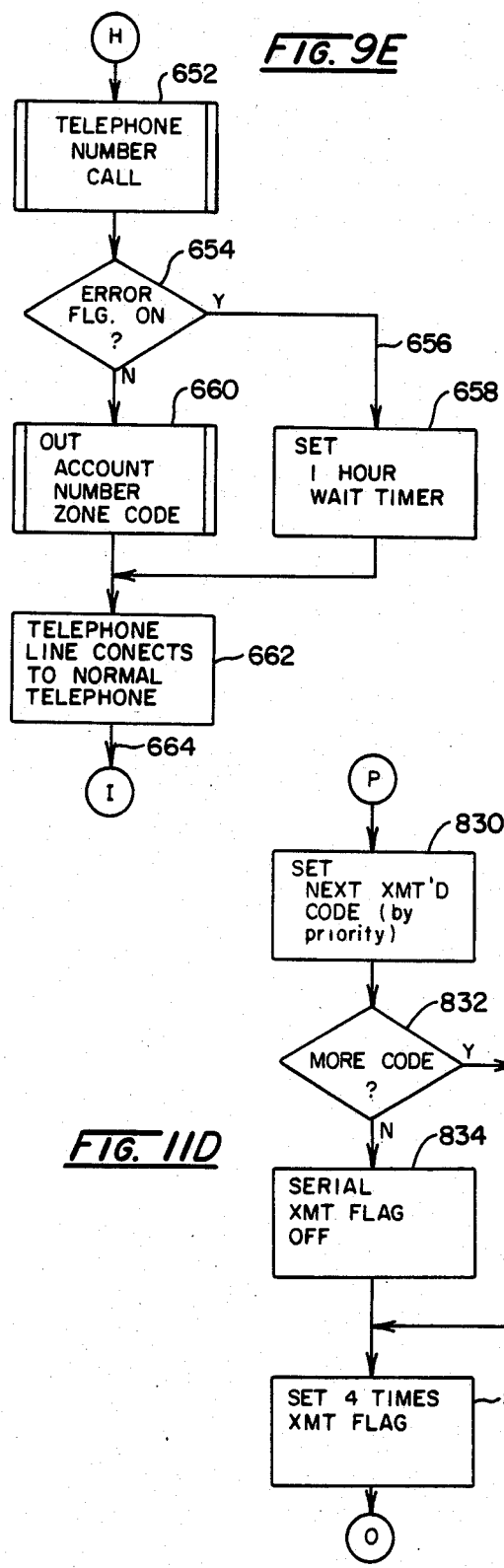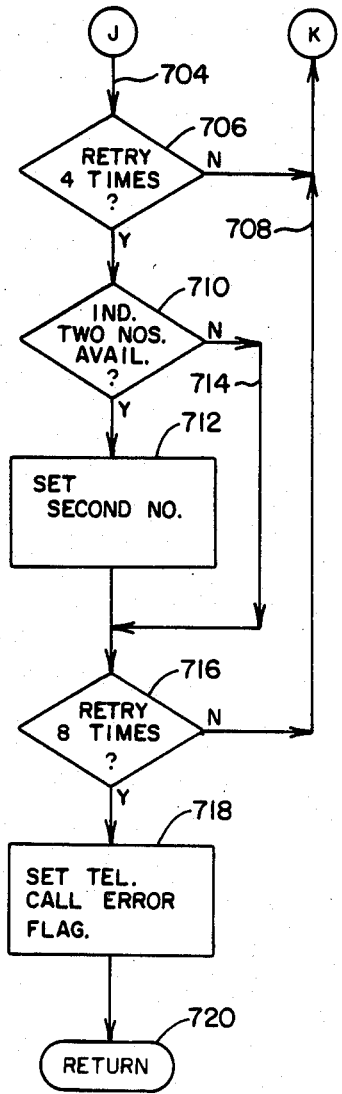

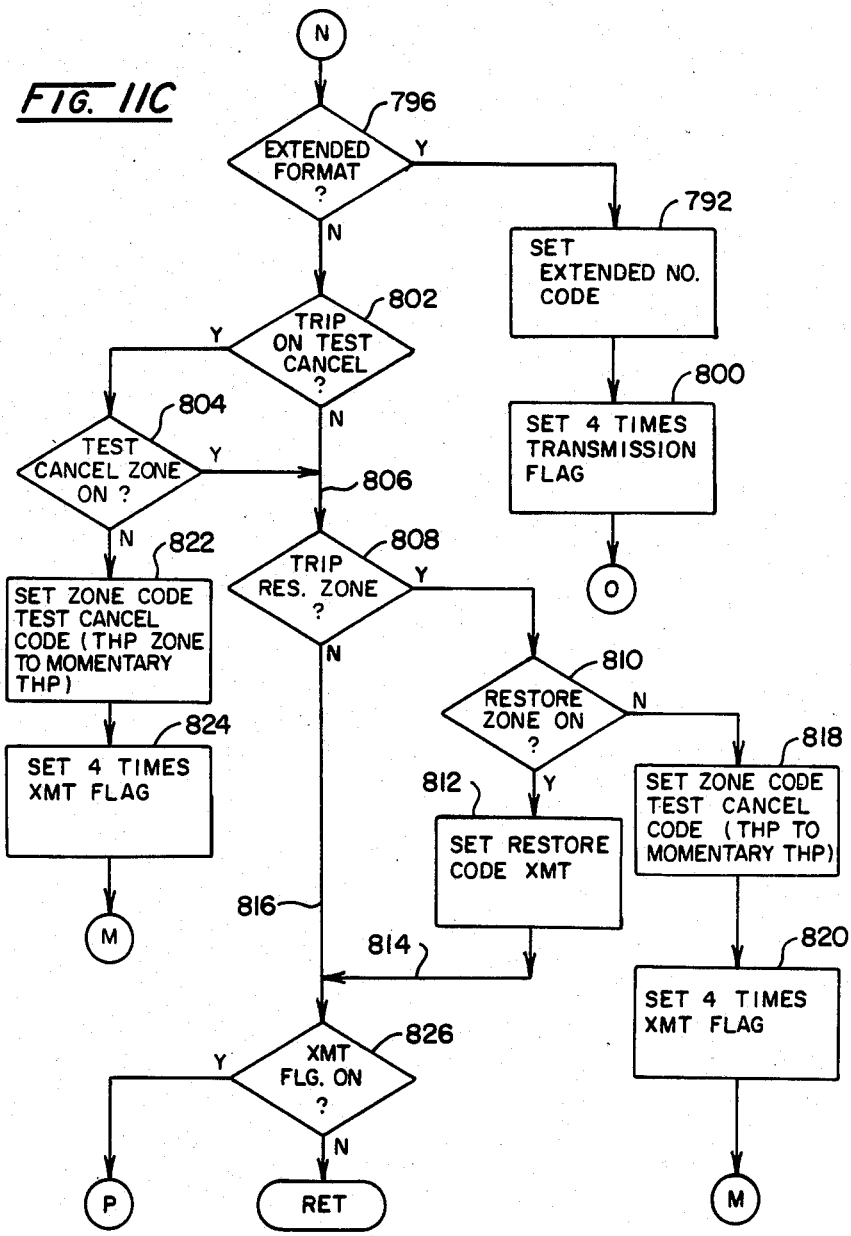

SECURITY APPARATUS AND SYSTEM

BACKGROUND

Home and business security systems have been devised under a broad number of schemes ranging from a dog that barks to ultra sophisticated and highly expensive installations designed for the protection of highly valuable property. For the most part, the systems have been dedicated to aspects of intrusion, using mechanisms designed to apprise one entity of the passage of another entity across a selected portal or vulnerable boundary.

With rising public concern over security in the home and neighborhood environments, more elaborate systems have been devised for that market wherein attempted entrance across certain portals such as windows or doors are monitored by any of a variety of mechanisms ranging from switches to, for example, ultrasonic motion detecting system techniques.

Once these devices are armed or activated to an alert state, an alarm signal will be generated on the occurrence of intrusion which is conveyed to a central control assembly located within the home or small business which then communicates with either a public law enforcement agency or a privately owned central security service facility. For these systems to be effective, they must permit legitimate exit and egress on the part of the user as well as authorized individuals, while establishing an effective armed and monitoring state during periods when such portals would not be used legitimately.

Such operation of the security system requires an understanding of arming logic on the part of the user to avoid the generation of false alarms. Where the user fails to comprehend the protocols for proper usage, a plethora of aborted alarms will render the type of service attempted to be provided unacceptably expensive. In effect, an acceptable security system for homes or small businesses must be "user friendly" to the extent that the aged and infirmed can use them as well as those who may experience difficulty in absorbing the nuances of electronic logic.

Security systems intended for the home and small business should retain a capability for accommodating a broadened range of service requirements particularly pertinent to that environment. For example, the services should be capable of generating immediate response to medical emergencies, as well as to remotely encountered confrontational emergencies such as hold-ups or the like. Further, the systems should be capable of monitoring the home environment during periods where the owners may be on vacation or away for extended periods of time. In this regard, the home should be monitored for such items as freezing pipes, lost power to furnaces and water heaters as well as to food storing freezer equipment. Flooding of basements and the like also represents the subject matter of monitoring and surveillance and, of course, the capability for surveilling the presence of smoke and fire as well as high heat must be provided.

While it is desirable to provide surveillance for all of the above enumerated aspects, such surveillance must be developed at costs commensurate with the budgets of the home owner and small business person. Further, the systems must be capable of asserting a priority over the subject matter monitored, as well as achieving a logic detection of false or misleading alarms.

SUMMARY

The present invention is directed to a user friendly security system particularly suited for use in conjuncton within a home or small business environment. The system not only contains a logic architecture which permits a broad variety of monitoring functions to be carried out but also which permits operation with users of varying talents. These features are achieved at cost levels commensurate with the intended use, the latter cost levels being minimized through the elimination of hard wiring for the more important of the monitoring services and through a logic interaction via telecommunication with a private central security monitoring service. In general, positions to be secured are monitored by small RF transmitters of restricted range, for example within the home environment for up to about 30 meters. A transponder function is provided within the home or business in the form of a console which is mounted, for example, on a wall location convenient to exit and entry but yet obscured from general public view. This console retained transponder is coupled with the telephone service to the home or business and carries out interactive communication with the central security monitoring service through that medium.

An object and feature of the invention is to provide a system for enhancing the security of a given facility having monitorable normal and first unsecure conditions, and conditions wherein a portal transitions to an open orientation representing an intrusion condition and the facility also having a telephone service line extending to telephone components or facilities therewithin and communicable with a security monitoring service. A transmitter is provided with the system which is positionable within the given facility and which includes a sensing circuit responsive to a select one of the unsecure conditions to generate an activation signal. A digital code arrangement is provided for selectively establishing a unique facility code which is correlatable the given facility within which the system is installed. A zone code arrangement is provided for dividing a zone code corresponding with the predetermined unsecured condition and a transmission antenna is provided in conjunction with a transmission arrangement which is actuable to transmit R.F. coded serial data signals from the antenna within a region substantially restricted to the given facility within which the system is installed. A transmitter power supply is provided for energizing the sensing circuit, the transmission arrangement and the control circuit.

The system further includes a transponder having idle and armed operational modes and which is operationally positionable within the given facility. The transponder includes a communicator network which is connectable with the telephone service of the given facility and which actuable for effecting digital telephonic communication with the security monitoring service. A status indicator means is provided with the transponder which is actuable to have an output condition during the idle mode to provide a perceptible indication that the transmission arrangement is not actuated in correspondence with one of the unsecure conditions. A home switch is provided with the transponder which is actuable during the idle operation mode to derive a pre-arm condition and an away switch is provided which is actuable during the idle operational mode to also derive a pre-arm condition. The transponder includes a receiver antenna which is coupled with a receiver circuit, the latter serving to derive serial pulsed signal outputs corresponding with received serial data signals. An arm switch is provided with the transponder which is actuable to selectively effect the armed and idle operational modes. An arm condition indicator is provided with the transponder which is actuable to have an output condition providing a perceptible output representing a pre-arm prompt for carrying out arming procedures and another perceptible output representing the armed operational mode. A logic network with the transponder responds only in the absence of a transmission by the transmitter during the idle operational mode to actuate the status indicator and is responsible when the status indicator is actuated during an idle operational mode to a home switch actuation to effect an arm condition indicator actuation to provide the perceptible output representing a pre-arm prompt. The logic network is responsive when the status indicator is actuated during the idle mode to an away switch actuation to effect an arm condition indicator actuation to provide a perceptible output representing a pre-arm prompt. The logic network further is responsive to actuation of the arm switch during the home switch actuation derived perceptible output representing a pre-arm prompt to effect the armed operational mode. The logic network is responsive to actuation of the arm switch during the away switch derived perceptible output representing a pre-arm prompt to commence time-out of a predetermined exit delay wherein the idle operational mode is maintained and it derives the armed mode at the completion of this exit delay time out. Further, the logic network is responsive to the receiver circuit serial pulsed signal outputs corresponding with an intrusion condition only during the armed operational mode for actuating the communicator network to effect transmission of digitally characterized signals corresponding therewith by telephonic communication with the security monitoring service. The logic network is responsive to serial pulsed signal outputs corresponding with first unsecure conditions during both idle and armed operational modes for actuating the communicator networks as above described. The logic network is further responsive to actuation of the arm switch in the presence of the armed operational mode to effect re-entry into the idle operational mode. The transponder further includes the transponder power supply which energizes the communicator network, the status indicator, the receiver circuit, the arm condition indicator and the logic network.

Another feature and object of the invention is to provide a transponder for use within a system for enhancing the security of a given facility having normal and unsecure conditions including a portal transitionable to an intrusion designated unsecure condition, the system including transmitters having broadcast outputs in the presence of an unsecure condition, such outputs including a facility code unique to the given facility and a zone code identifying the unsecure condition and wherein the given facility includes a telephone service line extending to telephone service facilities therewithin and communicable with a security monitoring service. The transponder includes a housing which is operationally positionable within the given facility and within broadcast range of the transmitters of the system. A communicator network is provided which is connectable with the telephone service and is actuable for effecting digital telephonic communication with the security monitoring service. A status indicator is mounted on the transponder housing which is energizable during an idle operational mode to provide a visually perceptible indication that a transmitter is not providing a broadcast output. A home switch is mounted upon the transponder housing which is actuable during the idle operational mode to derive a pre-arm condition, while a similarly mounted away switch is actuable during the idle operatonal mode also to derive a pre-arm condition. The transponder includes a receiver antenna coupled with a receiver circuit, the latter deriving serial pulsed signal outputs in response to and corresponding with the facility and zone code information of the broadcast outputs. An arm switch is provided on the housing which is actuable to selectively effect the armed and idle operational modes, while an arm condition indicator is positioned on the housing and is selectively energizable to provide a visually perceptible output representing a pre-arm prompt for carrying out arming procedures and further providing another visibly perceptible output representing an armed operational mode. An audible perceptible arrangement is mounted within the housing and is energizable to provide an audible output. The transponder includes a logic network mounted within the housing which is responsive only in the absence of a broadcast output and during the idle operational mode to energize the status indicator. The logic network is responsive when the status indicator is energized during the idle operational mode to a home switch actuation to effect energization of the arm condition indicator to provide the perceptible input representing a pre-arm prompt. The logic network further is responsive when the status indicator is energized during the idle operational mode to an away switch actuation to effect an arm condition indicator energizaton to provide a perceptible output representing a pre-arm prompt. The network further is responsive to actuation of the arm switch during the home switch acuation derived perceptible output representing a pre-arm prompt to effect the armed operational mode and effect alteration of the energization of the arm condition indicator to provide a perceptible output representing an armed operational mode. The logic network further is responsive to actuation of the arm switch during the away switch derived perceptible output representing a pre-arm prompt to commence time out of a predetermined exit delay wherein the idle operational mode is maintained and the energization of the arm condition indicator is altered to provide a perceptible output representing the armed operational mode and deriving the armed operational mode at the completion of the delay time out. The logic network further responds to the receiver circuit serial pulsed signal output for verifying the facility code information of the signal outputs and for actuating the communicator network to effect transmission of digitally characterized signals corresponding with the signal outputs by telephonic communication with the security monitoring service, the logic network being responsive to actuate the communicator network to effect transmission of digitally characterized signals containing intrusion designated insecure condition information only during the armed operational mode and is responsive to actuation of the arm switch in the presence of the armed operational mode to effect re-entry into the idle operational mode. The transponder further includes a power supply for energizing the communicator network, the status indicator, the receiver circuit, the armed condition indicator, the audibly perceptible arrangement and the logic network.

Another object of the invention is to provide a system for providing security for a given facility wherein monitorable normal and unsecure conditions including intrusion conditions are encountered and wherein said facility includes a telephone service line extending to telephone service facilities therewithin. The system includes a transmitter positionable in the locale of the given facility which includes a sensing circuit respondable in the presence of an unsecure condition to generate an activation signal as well as a digital code device for selectively establishing a unique facility code correlatable with the given facility. A zone code arrangement is provided for deriving a zone code corresponding with the unsecure condition and a transmission antenna coupled with a transmission circuit is actuable to transmit the facility and zone code information as broadcast outputs from the antenna within the locale of the given facility. A control circuit of the transmitter responds to the zone code and digital code devices in the presence of an activation signal for actuating the transmission arrangement to effect transmission of the facility code and zone code as a broadcast output. The transmitter function also includes a power supply for energizing the sensing circuit, the transmission circuit and the control circuit. A security monitoring service is provided having access to telephone communication and which includes computer which is responsive to digitally coded telephonic communication to provide visually, readably cognizable information corresponding to digitally coded facility code and zone code information transmitted thereto. The system further includes a transponder having armed and idle operational modes which includes a housing operationally positionable within the given facility and within broadcast range of the transmitter as well as a communicator network connectable with the telephone service and actuable for effecting digital coded telephonic communication with the security monitoring service. A status indicator is mounted on a housing which is energizable during the idle operational mode to provide a visually perceptible indication that the transmitter is not providing a broadcast output. A home switch is mounted on the housing which is actuable during the vital operational mode to derive a pre-arm condition, while an away switch also is so mounted and is actuable during the idle operational mode to derive a pre-arm condition. A receiver antenna is provided which operates in conjunction with a coupled receiver circuit mounted within the housing and serving to derive serial pulsed signal outputs in response to and corresponding with the facility and zone code information of the broadcast outputs. An arm switch is mounted on the housing which is key actuable to selectively effect the armed and idle operational modes. An arm condition indicator is mounted on the housing and is selectively energizable to provide a visually perceptible output representing a pre-arm prompt for carrying out arming procedures and another visibly perceptible output representing the armed operational mode. An audibly perceptible device such as a piezoelectric crystal driven device is mounted within the housing an is energizable to provide an audible output. A logic network controls the above which is mounted within the housing and is responsive in the absence of a broadcast output and during the idle operational mode to energize the status indicator. Further, the network is responsive when the status indicator is energized during the idle operational mode to a home switch actuation to effect energization of the arm condition indicator to provide the perceptible output representing a pre-arm prompt. The logic network is further responsive when the status indicator is energized during the idle operational mode to an away switch actuation to effect an arm condition indicator energization to provide a perceptible output representing a pre-arm prompt. Additionally, the logic network responds to an actuation of the arm switch during the home switch actuation derived perceptible output representing a pre-arm prompt to effect the armed operational mode and further effect alteration of the energization of the arm condition indicator means to provide a perceptible output representing the armed operational mode. The logic network is responsive to actuation of the arm switch during the away switch derived perceptible output representing a pre-arm prompt to commence time-out of a predetermined exit delay wherein the idle operational mode is maintained and the energization of the arm condition indicator is altered to provide a perceptible output representing the armed operational mode and deriving the armed operational mode at the completion of the exit delay time-out. The logic network responds to the receiver circuit serial pulsed signal outputs for verifying the facility code information of the signal outputs and for actuating the communication network to effect transmission of digitally characterized signals corresponding with the signal outputs by telephonic communication with the security monitoring service. The logic network is responsive to actuation of the communicator network to effect transmission of digitally characterized signals containing the intrusion designated unsecure condition information only during the armed operational mode and responds to actuation of the arm switch in the presence of the armed operational mode to effect re-entry into the idle operational mode. Additionally, a power supply is provided to the transducer for energizing the communicator network, the status indicator, the receiver circuit, the arm condition indicator, the audibly perceptible device and the logic network itself.

Other objects of the invention will, in part, be obvious and will, in part, appear hereinafter.

The invention, accordingly, comprises the system and apparatus possessing the construction, combination of elements and arrangement of parts which are exemplified in the following detailed disclosure. For a fuller understanding of the nature and objects of the invention, reference should be had to the following detailed description taken in connection with the accompanying drawings.

BRIEF DESCRIPTION OF THE DRAWINGS

FIGS. 6A–6C combine to form a schematic electrical diagram of the transponder circuit of the invention;

FIGS. 9A-9E are flow charts describing the logic program of the transponder utilized with the system of the invention;

FIGS. 10A-10B are flow charts describing a telephone number call subroutine utilized with the logic program of the invention; and FIGS. 11A-11D are flow chart of an out account number subroutine carried out by the logic components of the invention.

DETAILED DESCRIPTION

Figure 1:
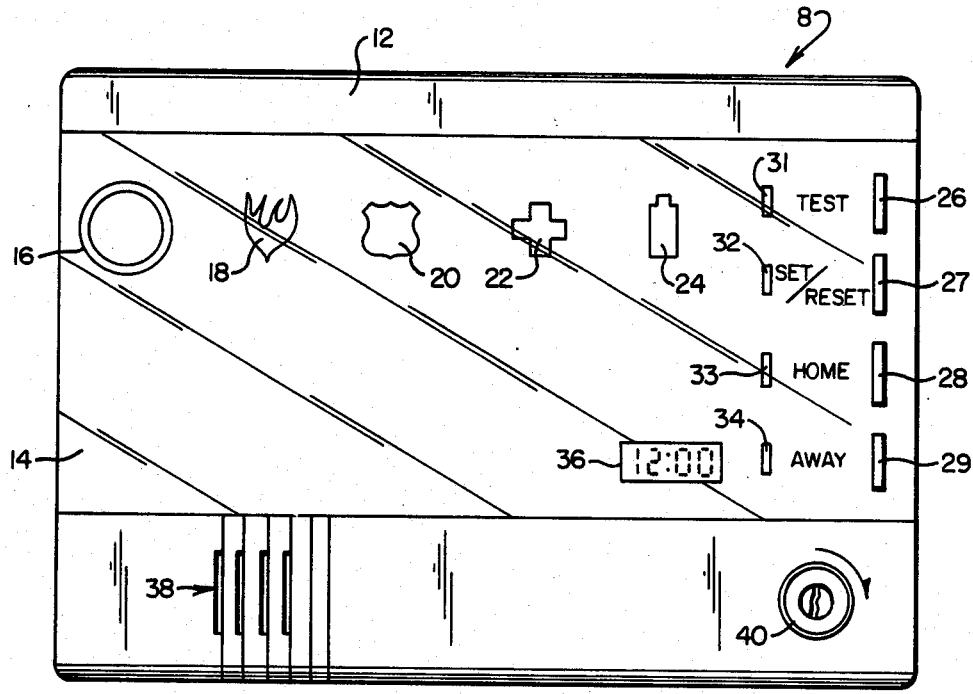
FIG. 1 is a plan view of a console retaining transponder components of the instant invention.

Looking to FIG. 1, a frontal view of the noted console retained transponder of the invention is represented generally at 8. Console 8 is powered from a conventional a.c. outlet through a line containing a rectifier circuit and which also serves as a receiving antenna responsive to transmitted alarm signals in the form of coded serial data. For the most part, the alarm signals are transmitted from small monitoring transmitters as at 10 in FIG. 1A which are actuated by sensor devices to broadcast coded R.F. signals. The coded data of these R.F. signals will include an identification of the facility such that the console 8 uniquely responds only to signals with that code identification. Next, the transmitted code will include a digitally coded representation of the type of alarm signal involved and this is through a "zone" designation. Generally, five pre-established zones are transmittable by numeric identification as follows:

1. Fire Alarm
2. Emergency
   a. medical emergency
   b. panic emergency
3. Intrusion Alarm
4. Silent Hold-up Alarm
5. Low Battery Alarm
6-8. Optional hardwired inputs for such items as furnace failure, freezer failure, pipe freezing, flooding and the like.

This numeric sequence also represents a priority of importance under which console 8 reacts in the event that more than one alarm is received essentially at the same time. Console 8 is conveniently sized such that it is readily wall or table mounted and is seen to include a molded plastic housing 12 which supports a forwardly facing face plate 14 carrying a series of visual readouts and manually actuable switches. In this regard, an active power supply is represented by the illumination of the indicator 16; the receipt of a fire alarm or the like is represented by the illumination of the flame symbol indicator 18; the receipt of a transmitted intrusion alarm signal is represented by the illumination of a police badge symbol indicator 20; the receipt of a signal representing an emergency, for example medical or panic, is represented by the illumination of a red cross symbol indicator 22; and the receipt of a signal or generation from within console 10 of a signal representing that a battery is below acceptable capacity is represented by the illumination of a battery symbol indicator 24.

The hand manipular switches extending through the face plate 14 include a test switch 26; a reset switch 27; a "home" switch 28 and an "away" switch 29. Switches 26-29, respectively, are shown adjacent selectively illuminatable and rectangularly shaped visual readouts 31-34. With the exception of readout 32, labelled "SET", these readouts are associated with the labelled operational functions of test, home and away. Readout 32 is a status indicator which is energizable during an idle mode of the system to indicate that all monitored doors and windows are closed. If a monitor transmission (door or window) is received, the indicator is deenergized. A digital time clock is provided at 36 within face plate 14 and rectangular openings within the housing 12 as at 38 provide a sound outlet for a piezoelectric driven audible alarm device adjacent thereto having an output strength, for example, in the range of about 85 db. The console 8 further includes an arm switch 40 including a receptable for receiving a key, actuation of said key being the only manner by which the switch may be operated. The switch 40 preferably is of a spring biased self return variety wherein the operator in carrying out an arm or disarm function for the system inserts the key and turns it in the direction indicated by the arrow to a stop position, whereupon the key returns to its normal orientation.

Not shown in FIG. 1, is a silent hold-up switch, which is an obscure surface position switch along one side of console 8 which may be actuated by the operator in conditions of extremis such as robbery or the like.

With the exception of small, hand carried transmitter operable with the system for remote arming purposes, the console 8 contains all of the required inputting and control devices for operator use. The circuitry thereof is developed to provide for operation in what is termed as an "idle" or "no" mode as well as an "armed" mode. The latter mode is utilized in conjunction with intrusion forms of monitoring. In this regard, the system will not communicate by telephone with a security monitoring service with respect to intrusion zone emergencies unless it is in the noted armed mode, inasmuch as the intrusion situations are those wherein the highest likelihood of false alarms will occur.

Arming Procedure-Home

In a situation where the user is to remain at home or in the facility within which the system is installed and desired to actively monitor for intrusion, for example at doors, windows, and the like, the procedure for arming commences when the transponder 8 will be in an idle mode, the indicator light 16 showing that it is powered. If all doors and windows are properly closed or in their appropriate orientation such that there is no transmitted intrusion signal, then the status indicator 32 will be illuminated, preferably in a green color. Where no such illumination is present, then the user is apprised that there is a monitored door or window open or some breach of security exists. On such an occasion, the intrusion monitors as at 10 may be inspected. Looking again to FIG. 1A, during such time as intrusion monitor as at 10 is broadcasting an alarm signal, a small visual indicator present, for example as an LED 42, will be illuminated. The user merely secures the door by closing it or secures the window or the like to terminate alarm signal transmission. When the home or facility has been made secure by the user, then the visual status indicator 32 will be illuminated and the user is permitted to carry on arming procedures.

Arming procedures commence with the simple expedient of actuating home switch 28 and when this switch is actuated, the visual readout 33, which may be provided as a red colored LED commences to flash or blink at a rate of about once per second. This visual readout is a rompt to the user that the system is not armed and to arm it, an actuation of arm switch 40 is required. The user then inserts a key into the key barrel of arm switch 40, turns the key to, for example, a 3 o'clock position and permits the key to return to its initial position. This procedure will cause the system to become armed and to receive transmitted intrusion signals and automatically transmit them to the security monitoring service. At such time as switch 40 is properly actuated, the visual indicator 33 transitions from an intermittent blinking energization to a steady state energization to apprise the operator that, indeed, the system is armed. On the occasion of any subsequent intrusion or actuation of a device as at 10, the system will react by siezing the telphone line within the home or facility, calling the security monitoring service, and transmitting in digital format a code identifying the facility and the zone or intrusion condition in serial data fashion. An intrusion will be indicated at console 8 by the energization and illumination of the police badge type symbol at 20 as well as the activation of the piezoelectric audible alarm device beneath openings 38 in the housing 12. In this regard, the audible alarm is also coded such that it provides about an 85 db output of noise in continuous fashion. Where desired, an externally mounted siren also may be employed. After an alarm or intrusion transmission has been responded to by the transponder 8, then that alarm state will remain for a predetermined interval of time, for example about ten minutes until such time as the operator reinserts the key in arm switch 40 and actuates it to terminate the alarm condition. Such termination also will return the system to an idle mode with the de-energization of visual readout LED 33. This is a restore procedure. Other aspects of alarm are discussed, for example in conjunction with false alarm programming later herein. In the event that the operator does not actuate arm switch 40 following the actuation of home switch 28 to enter into an armed mode, the system will cancel the home switch 28 actuation effect as well as the intermittent energization of indicator 33 following an interval of about 30 seconds. During the arming procedure wherein the indicator 33 is flashing or intermittently energized, the transponder 8 remains in the noted idle operational mode.

Arming Procedure-Away

The second form of intrusion surveillance carried out by the system is one wherein the user desires to arm the system and subsequently leave the facility by exiting through a door which is the subject of monitoring by transmitting devices as at 10. Under such circumstances, the transmitting device will be activated to transmit a serial data output indicating that an intrusion has occurred. Accordingly, in conventional fashion an exit interval is provided by the system. To carry out the "away" arming procedures, the user again observes the status of all portals monitored by transmitters as at 10 and, with the appropriate energization of the status indicator 32, is apprised that all portals are secure. It should be understood that the indicator 32 can be energized or de-energized to carry out this apprisal function. However, it is preferred that energization, a positive visual cue, be provided to indicate that all portals are secure. The arming procedure commences then with the actuation of away switch 29 which, in turn, will cause the away visual indicator 34, which may be present as a red tinted LED, to commence to be intermittently energized, for example, at the noted rate of about once per second. This constitutes a prompt to the user that an arming procedure next is required, specifically by the insertion of the key into the key barrel of arm switch 40 and the actuation thereof as above described. In the event this arming procedure is not carried out, then the effect of the procedure to this point is cancelled as above described in conjunction with the home operational procedures.

Upon the actuation of arm switch 40, an exit time delay is initiated, for example, 45 seconds. This exit delay precedes the entry of transponder 8 into an armed operational mode. To apprise the operator that this exit delay is under way, the away indicator 34 remains energized on a steady-state basis and the audible alarm beneath openings 38 is sounded at the noted 85 db level at a rate of one pulse per second. During this delay, the user may exit from the door or portal otherwise monitored by transmitters 10 and the transmission of an alarm signal will be ignored by the transponder 8. Assuming the portal is then resecured, and the exit interval timed out, the transponder 8 will enter an armed operational mode and respond to any subsequent intrusion by telephonic communication with the security monitoring service, however, following an entrance delay, for example of 30 seconds.

Concerning the entrance delay, when the user returns to re-enter a door or portal then being monitored by devices 10, upon such entry, the transmission will be broadcast by the monitoring transmitter 10 which will be recognized by the transponder 8 and cause it to commence the entry delay. As the user enters the monitored door or portal, a prompt will be provided by the enegization of the audible component of transponder 8 adjacent openings 38, such energization of the sound device being, for example, at an intermitting rate of about 2 pulses per second. During the entry interval, the user re-inserts the key into the barrel of arm switch 40 and actuates it to cause the sytem to re-enter an idle mode. Failure to disarm the system within the interval assigned for re-entry will cause the system to enter into an alarm condition and telephonically convey intrusion information to the security monitoring service. Such activity involves, as before, the energization or illumination of the indicator 20 along with the development of a steady state output from the sound component adjacent openings 38. As before, restore and false alarm programming may be provided in conjunction with such transmissions.

From the foregoing, it may be observed that the user is prompted to properly operate the system including transducer 8 in conjunction with intrusion forms of surveillance. Note that the system will not exit from an idle operational mode until the set indicator 32 shows that the security of all portals is not breached. Once that condition is met, then the system, operating through indicators 33 and 34 prompts the operator to carry out an arming function. In the away form of performance, the operator is given an aural indication that an exit interval is under way and that same indication is provided upon re-entry from disarming purposes. Arming can only be carried out with a key and disarming also can only be carried out through the use of that same key.

Fire-Emergency-Low Battery Operation

The fire detection function is one which is generally in operation on a continuous or 24 hour per day basis. Detection itself is by conventional means, for example, smoke detection may be carried out utilizing ionization chamber devices or photoelectric techniques, heat may be detected by conventional heat detectors and the like. For application to the instant system, the outputs of these detectors are coupled with a transmission circuitry which essentially is identical to that utilized for intrusion monitoring as described at 10. The fire detection information will be received in coded fashion, a typical transmission providing for an initial identification of the facility involved followed by a zone or fire identification code upon which parity checks and the like may be performed. The fire detection system performs while the transducer 8 is performing in the noted idle operational mode or armed operational mode.

The response of the system to a transmitted fire alarm signal is one wherein the noted telephone system is siezed and digital telephone communication is made to the security monitoring service. Simultaneously, the visual indicator 18 is illuminated and the audio component of the console adjacent openings 38 provides a relatively rapidly pulsed output.

The emergency operation of the system performs in similar fashion to that of the fire detection port. In this regard, the emergency aspect of the system operates on a continuous or 24-hour per day basis while the transponder 8 is in either an armed or idle operational mode. The type of transmitter utilized is essentially identical to that described at 10 in conjunction with intrusion monitoring, however, it generally is hand carried either mounted on a belt or within a pocket. The transmitted signal is initiated by a hand operated switch and, as before, identifies the facility and subsequently identifies the zone or emergency condition in digital manner. The transponder 8 responds and, without more, siezes the telephone communication of the facility and contacts the security monitoring service with essentially the same information. When the transmission of the facility code and zone code is received by transponder 8, automatic telephonic dialing takes place and, simultaneously, the visual indicator 22 is illuminated and the audible alarm adjacent openings 38 is activated in pulsed fashion at a relatively slow rate, for example one second on and one second off.

One further aspect is involved in the transmission of the emergency information to the security monitoring service, that being that the computer system of that service is programmed to determine whether or not any such received emergency zone information is one involving a medical alert requiring that the service dispatch medical-paramedical help or whether the emergency signal is "panic" in nature, for example a hold-up or the like. Appropriate remedies are undertaken by the monitoring service depending upon this programming.

To assure reliability as well as to provide for simplicity in installation of the instant security system. All of the transmitters utilized therewith, for example, as for emergency or for intrusion as described at 10, are battery powered. Additionally, while the transponder 8 is powered from a conventional a.c. outlet, it contains a nickel cadmium battery back-up power supply which is continuously charged from the a.c. source. This transponder battery supply as well as each of the intrusion battery supplies are monitored by the instant system. In this regard, the individual intrusion transmitters as at 10 contain a battery monitoring network which will provide for a transmission identifying the facility code and a low battery zone identification. The circuit of each of the transmitters as at 10 samples the output quality of its battery once every minute in operation. Further, the LED 42 on each transmitter will be energized over a four second period once per minute to indicate a low battery and aid in the identification of that transmitter which, while remaining operable, has a battery which should be replaced. For example, where a monitored door or window is closed but transmitter 10 associated therewith exhibits an illuminated LED 42, a low battery condition is indicated inasmuch as the LED 42 normally if off for this situation. The transponder 8 contains a battery condition circuit described in detail later herein which causes it to carry out a low battery report function.

Concerning the technique of low battery reporting, when the transponder 8 receives a low battery transmission in the noted dated string fashion, it will sieze the telephone system of the user facility and communicate with the security monitoring service forthwith, this battery monitoring feature being continuous, ie. on a 24-hour per day basis, and operable in either idle or armed operational modes. Simultaneously with communication seizure, the visual indicator 24 is illuminatedon a continuous basis and the audible alarm feature adjacent openings 38 provides a pulsed audible sound at the rate of once per minute and this sound output continues for 10 minutes and then shuts down.

Battery monitoring in conjunction with the transponder 8 will be seen to involve a straight forward time-out upon loss of principal or a.c. power. This technique is utilized in consequence of the rapid drop-off of the output characteristic of nickel cadmium batteries. At the end of such time out, the above described telecommunication is made along with visual and audible outputs.

As noted above, fire surveillance, emergency surveillance, and low battery surveillance carried out by the system are each operative in both idle and armed operational modes. In the event the user wishes to turn off these functions once the transponder 8 has been activated and the system is in an idle mode, then reset switch 27 is actuated. This will cause a cessation of all perceptible outputs from the transponder 8. In conditions where an alarm signal is generated and the transponder 8 is in an armed operational mode, then disarming the system, as before, can be carried out only by user insertion of the arm key within arm switch 40 and the actuation thereof. Notwithstanding any disarming or reset procedure, silent hold-up alarms or "hard wired" auxiliary monitoring features will be the subjects of telephonic transmissions by transponder 8.

Test Operation

It is desirable, for example, to assure user confidence, that the transponder 8 be capable of undergoing certain test procedures. In this regard, the test switch 26 may be actuated when the transponder is in an idle operational mode which will cause the illumination of a green tinted visual output present, for example, as the LED at 31. When the system is within this test mode, the various functions may be tested and the system will not carry out automatic telephonic contact with the security monitoring service. The test mode may be removed by a second actuation of switch 26. During the carrying out of any test operational mode procedure, certain of the functions will remain intact in the event an alarm signal is transmitted to transponder 8. In this regard, silent hold-up and auxiliary functions will be transmitted by transponder 8 to the security monitoring services, notwithstanding the presence of a test mode. Further, where the home switch 28 or away switches 29 have been actuated in the course of a test mode and the arm switch 40 is actuated, then the system will become armed and automatically exit from the test operational mode.

Silent Hold-up Operation

As indicated herein, an obscure switch (not shown) is positioned at one side of the transponder 8. This switch is intended for actuation under extreme conditions, such as during a hold-up. Depression of the switch will always cause the transponder to carry out telephonic communication with the monitoring service without providing any perceptible indication of such operation being carried out. In effect, the silent hold-up function of the transponder 8 is one of direct communication with the security monitoring service.

Table 1 below provides a summarizing illustration of the operation of the transponder 8. In the table, an "O" indicates that a visual indicator can be energized or whether or not a particular operational function can be operative. In like manner, the presence of an "X" in the table indicates a condition where such visible indicator or operational function cannot be carried out. The table also shows the available operation of the externally mounted siren. It may be observed from the tabulation that the operation is made available for actuating the siren are limited to avoid public nuisance.

The transponder 8 also contains screw type terminals for providing hardwired auxiliary inputs thereto from such monitors as the earlier described flood detection, furnace monitoring and/or frozen pipes and freezer detection. Other desirably monitored features may be utilized in conjunction with these terminals. Table 1 indicates that the transponder 8 will react to any inputs to these auxiliary terminals in the same manner as it responds to the above-described silent hold-up switch.

TABLE 1

|  |  | Idle Mode | Test | Arm Home | Arm Away Exit | Arm Away Entry (30 or 45 sec.) |
|---|---|---|---|---|---|---|
| Test Sw. |  | O | O | X | X | X |
| Home Sw. |  | O | X | O | X | X |
| Away Sw. |  | O | X | X | O | O |
| Hold-Up Sw. |  | O | O | O | O | O |
| Reset Sw. |  | O | O | X | X | X |
| Status (Set) Indicator | Test | X | O | X | X | X |
|  | Home | X | X | O | X | X |
|  | Away | X | X | X | O | O |
|  | Status (Set) | O | O | O | O | O |
|  | A.C. Power | O | O | O | O | O |
| Security Indicator | Intrusion | X | O | O | O | O |
|  | Fire | O | O | O | O | O |
|  | Emergency (medical-panic) | O | O | O | O | O |
|  | Low Battery | O | O | O | O | O |
| Horn | Intrusion | X | O | O | Slow | Rapid |
|  | Fire | O | O | O | O | O |
|  | Emergency | O | O | O | O | O |

TABLE 1-continued

|  |  | Idle Mode | Test | Arm Home | Arm Away Exit | Arm Away Entry (30 or 45 sec.) |
|---|---|---|---|---|---|---|
|  | Low Battery | O | O | O | O | O |
| Siren | Intrusion | X | X | O | X | O |
|  | Fire/Emergency | O | X | O | O | O |
|  | Low Battery | X | X | X | X | X |
| Auto Dial Tel. | Intrusion | X | X | O | X | O |
|  | Fire | O | X | O | O | O |
|  | Emergency | O | X | O | O | O |
|  | Low Battery | O | X | O | O | O |
|  | Hold-up | O | O | O | O | O |
|  | Auxiliary | O | O | O | O | O |

Programmable Operational Functions

There are a variety of functions which can be programmed into the logic circuitry of the transponder 8. Generally, these functions involve communication features and may be readily programmed into a given facility by service agencies for the system. The programming may be customized to the particular needs of a user and is described in enhanced detail in connection with the flow charts later herein treated.

Transponder 8 may be programmed to transmit a restore code to the security monitoring service in situations wherein an alarm has been transmitted to the monitoring service and the transponder has been disarmed by arm switch 40. On the occasion of such disarming action, the transponder transmits a restore code indicating that the user is on the premises and has turned off the alarm and transmission of alarm information.

Transponder 8 also may be programmed to provide a test cancel code wherein the transponder will have commenced communication with the security monitoring service but will have been de-activated before transmission is complete. In such instances, programming may be provided which transmits this test cancel code to, in effect, indicate a withdrawn alarm.

Transponder 8 further may be programmed to provide a period of delay between the receipt of an alarm from a transmitter as at 10 and the actual commencement of telephonic communication with the security monitoring service. Such time interval, for example, may be in the range of 10 to 150 seconds and permits the user to cancel an alarm condition before telephonic transmission in situations wherein the user simply has forgotten that a door has been opened and that the system is in an armed condition.

Generally, the transponder 8 is programmed to dial a given singular telephone number to access the security monitoring service. However, the device also can be programmed to dial a second telephone number in sequence either in the event that a certain number, for example four attempts at the first number fail, or in a situation where another party is sought to be accessed in case of an emergency. For example, where the system is installed in a multi-family facility, the manager of such facility may wish to receive an indication of any emergency conditions. These second telephone number also can be programmed to be called only in connection with certain identifiable zones. Zone selection can also be made in conjunction with all of the above discussed programmable features.

For some user installations, the system will, from time to time, be in an environment wherein a statistically larger number of false alarms may be created. Under such situations, the control circuit of the transponder 8 can be programmed such that the number of alarms transmitted in a certain period of time, for example in one hour, will be compiled for a given zone and in the event that, for example, three or more such alarms are received in that one hour period, the response of the transponder 8 to that zone will be de-activated for a given period of time, for example 24 hours.

Security Monitoring Service

All of the consoles as at 8 along with associated transmitters as at 10 or those of the hand carried variety perform in conjunction with the noted security monitoring services. The areas served are based upon the capabilities of the security monitoring services which receive the automatically dialed telephonic inputs from the transponders 8 and, preferably, intercede with a human element providing for the rendition of security services. The monitoring service will be based about a computer response to incoming calls and the computer, for example, Data General Model 20 and 30 systems, responds to identify the customer, retrieve necessary customer information and print-out a hard copy record of the alarm as well as a dispatch ticket for carrying out necessary services. These services can range from contacting fire and medical or police to the scheduling of battery replacement.

Transmitter Structure

Figure 2A:
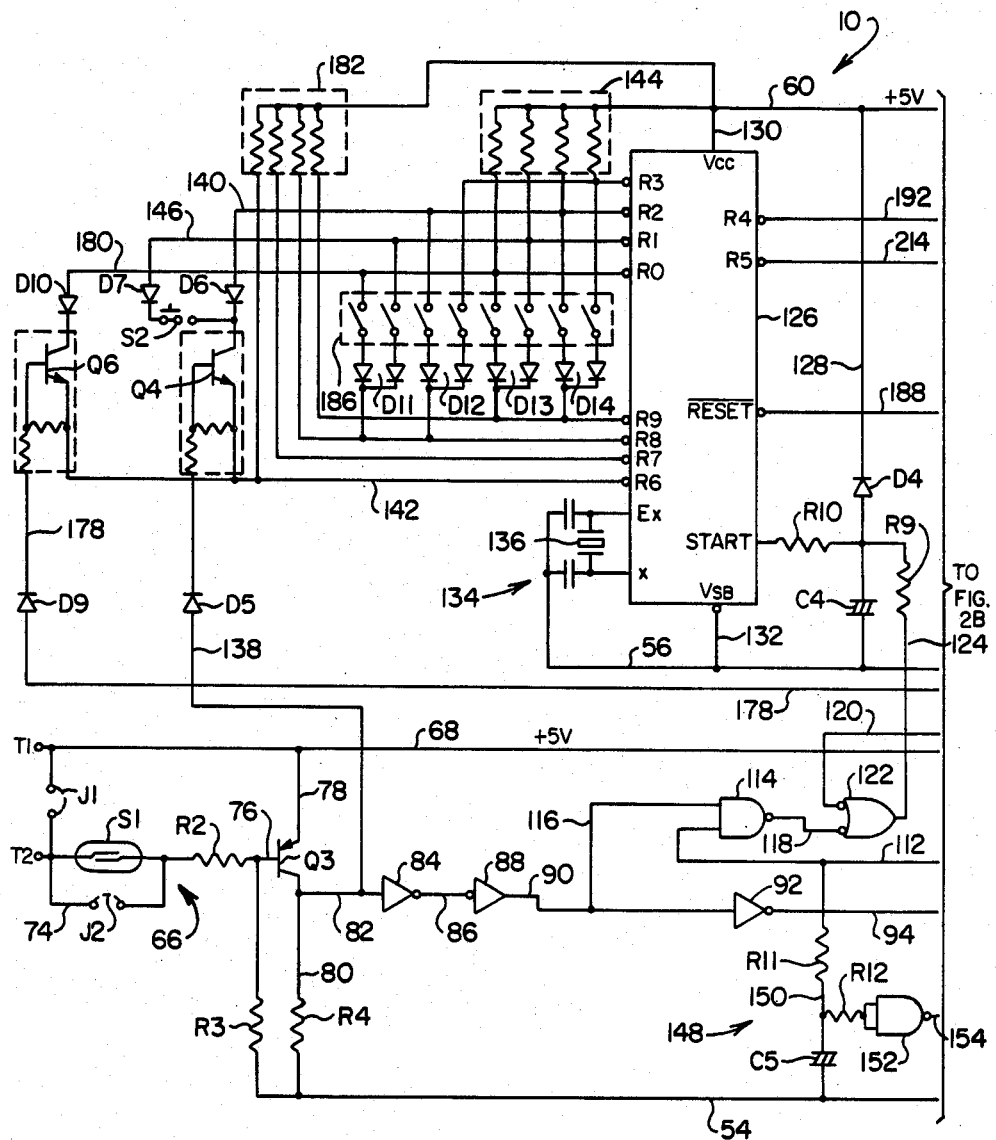
FIGS. 2A and 2B combine to provide a schematic circuit diagram of a transmitter according to the invention.
Figure 2B:
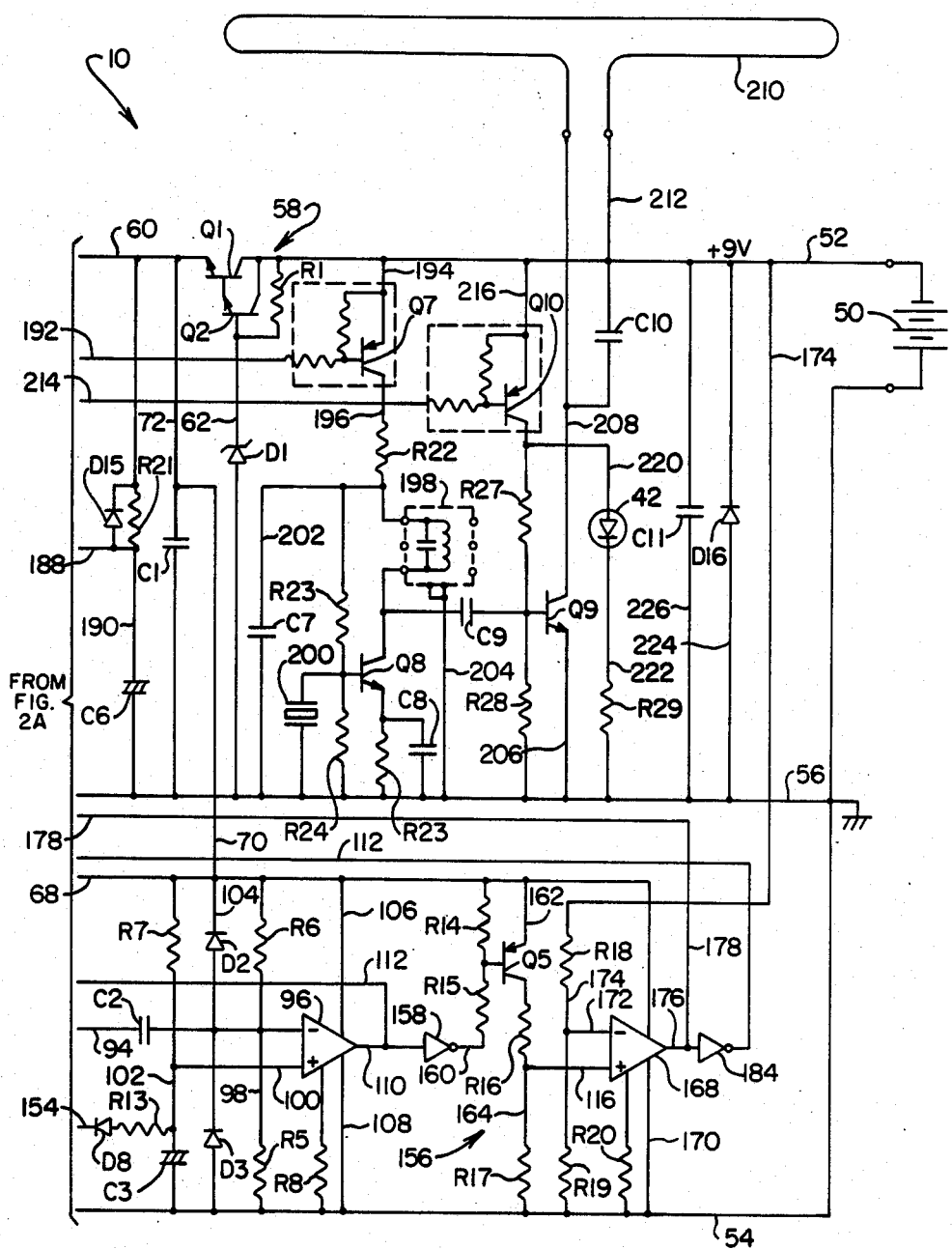

Referring to FIGS. 2A and 2B, the arrangement of circuit components for the transmitter as at 10 are revealed in enhanced detail. These figures should be considered conjointly, FIG. 2A being positioned leftwardly from FIG. 2B as labelled on each of the drawings. Transmitter 10 is powered as above described by a battery represented in FIG. 2B at 50. Battery 50 may be of the 9 volt variety and is coupled into transmitter 10 by a conventional snap-on connection and provides a 9 volt supply to power leads 52 and 54. Lead 54 is tapped at lead 56, while lead 52 extends to a stabilizer or regulator network 58 which provides a +5 v rail at 60. Network 58 is seen to comprise Darlington coupled NPN transistor pair Q1 and Q2 associated with resistor R1. In conventional fashion, the base of transistor Q2 of the Darlington pair is coupled through line 62 and a Zenner diode D1 to ground line 56.

Looking to FIG. 2A, the sensor actuation elements of the transmitter 10 are revealed generally at 66. For typical intrusion monitoring applications wherein transmitter 10 is mounted adjacent a door or window, a reed relay switch is employed in conjunction with a magnet. In this regard, the transmitter 10 housing is fixed to one of the portal components while the magnet is affixed to the other, a relationship between the magnet and reed relay switch S1 being that the switch is open when the portal security has been breached, ie. a door or window is open. External screw type terminals as at T1 and T2 also are provided such that the transmitter 10 may operate in conjunction with glass breakage detectors and the like. It may be observed that switch S1 is coupled through a jumper J1 to a line 68 which carries a +5 v power supply. This voltage level is derived in consequence of the connection of line 68 through lines 70 and 72 to rail 60. A capacitor C1 is shown incorporated within line 72 which extends between rail 60 and line 56 (FIG. 2B). When the transmitter 10 is used in a doorway to detect intrusion, then jumper J1 is left intact, while jumper J2 is removed. Should the sensor be utilized in conjunction with a glass breakage detector having normally closed contacts which open upon breakage, then jumper J1 is cut and connection is made with terminals T1 and T2 to the breakage sensor. Where, on the other hand, transmitter 10 is used in conjunction with the monitoring of a window, external sensors are utilized which are connected to terminals T1 and T2, jumper J2 is left intact and jumper J1 is cut. Of course, switch S1 may be removed for the window monitoring function. Further, where the transmitter 10 is utilized in conjunction with heat sensor, for example having a bimetallic strip which is normally closed and which opens in the event of heat reaching a predetermined level, then terminals T1 and T2 again are utilized in conjunction with the connection of jumper J2.

Network 66 performs in a secure condition wherein the portal under surveillance is closed and the tines of switch S1 are closed magnetically and there is the application of the noted +5 v level at line 68 through resistor R2 which, in turn, is coupled via line 76 to the base of PNP transistor Q3. Note that line 76 also is coupled through resistor R3 to ground line 54. The emitter of transistor Q3 is coupled from line 78 to line 68, while the collector thereof is coupled by line 80 to resistor R4 and line 54. With the arrangement shown, the transistor Q3 is "off" during such conditions wherein switch S1 is closed and is drawn into conduction by removal of the base bias thereof at such time as switch S1 opens or the equivalent occurrence takes place at network 66. As transistor Q3 is turned on in consequence of the development of an alarm condition, the voltage level at line 82 alters to a logic high. Line 82 is directed to the input of a buffer inverter 84, the output thereof at line 86 experiencing a logic low in consequence of inversion at component 84. Line 86 is directed to the input of a second buffer inverter 88 to, in consequence, provide a logic high level at its output at line 90, in turn, is directed to the input of another buffer-inverter stage 92, the output of which at line 94 carries a resultant low logic level derived therefrom. Looking to FIG. 2B, it may be observed that line 94 extends to the negative input of an operational amplification stage 96. However, the low transitioning signal at line 94 is differentiated by a differentiation circuit including a capacitor C2 within line 94 and resistor R5 extending within line 98 between line 94 and line 54. In consequence, a sharp, low going pulse is presented to the negative input of stage 96. Note that line 98 also contains a resistor R6 of equivalent rating with resistor R5. The latter serves a voltage dividing function with resistor R5.

The positive input to amplification stage 96 is coupled via line 100 to line 102 which, in turn, extends between lines 68 and 54. Line 102 incorporates a resistor R7 in combination with a capacitor C3 to provide an RC configuration. Additionally associated with line 94, is line 104 extending between lines 68 and 54 and containing diodes D2 and D3. Comparator stage 96 is shown coupled to +5 v at line 68 from line 106 and to ground through line 108. The output of the stage, upon receipt of the differentiated low going pulse input, is a positive rectangular pulse output at line 110 having a sharp rise time characteristic. Line 110 is seen to be coupled with line 112 which, in turn, looking to FIG. 2A, extends to one input of a NAND gate 114.

The opposite input to NAND gate 114 at line 116 extends to line 90 which, as above described, carries a logic high in the presence of an alarm signal. The resultant output of gate 114 is a negative going rectangularly shaped pulse which is directed along with a corresponding low logic level at line 120 to the input of NOR gate 122. The output at gate 122 at line 124 then is a positive going rectangular pulse which is directed through resistors R9 and R10 to the start input terminal of an integrated circuit 126. Note that line 124 is coupled to line 128 extending, in turn, between lines 56 and 60 and carrying capacitor C4 and diode D4.

Integrated circuit 126 is of a four bit variety serving essentially to encode digital data derived principally by switch selected inputs. The device provides for parallel to serial multiplexing of such data inputs. Note that the circuit is powered from lines 60 and 130 at the Vcc input terminal thereof and at line 132 coupled from ground line 56. Present, for example, as a type NB88202 device marketed by Mitsubishi Electric Corporation, the circuit 126 is provided a one MHz external clock input at its $E_x$ terminals by clock structure 134 including crystal 136.

A high logic level alarm signal at line 82 extending from the collector of transistor Q3 also is directed along line 138 including diode D5 to the base of a transistor network identified at Q4. The collector and base terminals of transistor Q4 are connected with line 140 incorporating diode D6 and extending from terminal R2 of integrated circuit 126. The emitter electrode of NPN transistor network Q4 is coupled to line 142 which extends to terminal R6 of circuit 126. Thus, at such time as a logic high is developed at lines 138 in correspondence with an alarm signal, transistor Q4 is biased into conduction and a positive level signal is available from intrusion designated terminal R2 for application to terminal R6. Note that line 140 is coupled with +5 v through one resistor of pull-up resistor grouping 144.

Transistor network Q4 also serves to activate a line 146 extending to integrated circuit 126 terminal R1 and coupled with a pull-up resistor grouping 144. Line 146 incorporates a diode D7 which extends through a selectively manipulable switch S2 to the collector of transistor network Q4. Terminal R1 of circuit 126 is a fire warning designated terminal, and thus, when terminals T1 and T2 are coupled with a heat detector, line 146 provides fire warning logic. Where simultaneous intrusion and fire warning signals are received, then priority is programmed for the output from terminal R1.

As indicated earlier herein, the condition of the battery of transmitter 10 is investigated on a periodic basis such as every 60 seconds. The timing for developing this investigation is achieved in conjunction with the performance of an RC network including capacitor C3 and R7 within line 102 which extends from +5 v at line 68 to line 54 as well as another RC network 148 (FIG. 2A) which includes capacitor C5 operating in conjunction with resistor R11 within line 150. Note that line 150 extends between ground line 54 and line 112 representing the output of comparator stage 96. The negative input to stage 96 is developed at 2½ volts in view of the voltage dividing function of resistors R5 and R6. When the system is activated, the RC network including resistor R7 and capacitor C3 commences to charge over an interval of time approximating one minute. The network is coupled to the opposite input to comparator stage 96 through line 100 and, at such time as it develops a voltage level corresponding with that at the negative input of the comparator stage 96, ie. about 2½ volts, the stage is activated and a logic high is presented at output line 110 as well as line 112. This pulse, in turn, activates RC network 148 (FIG. 2A). The short voltage build-up is witnessed through resistor R12 which is directed to both inputs of NAND gate 152. Gate 152 rapidly responds to develop a logic low at its output line 154 and, looking to FIG. 2B, this logic low at line 154 serves to rapidly discharge capacitor C3 through resistor R13 and diode D8 in line 154 through the gate 152. The cycle then repeats itself with a periodicity of about 60 seconds. Note, additionally, that with each such periodic activation, the START terminal of integrated circuit 126 is actuated.

FIG. 2B also reveals the low battery level detection network as shown generally at 156. As indicated earlier herein, a logic high pulse is developed at line 110 on a 60 second periodic basis for the purpose of carrying out battery analysis. This logic high pulse is directed through an inverter 158, the output of which is present at line 160 and which represents a negative going pulse. Line 60, incorporating resistors R14 and R15 is coupled to +5 v supply at line 68 and the interconnection between resistors R14 and R15 is coupled to the base of a PNP transistor Q5. The emitter of transistor Q5 is coupled via line 162 to line 68, while the collector thereof is coupled to a divider network including resistors R16 and R17 within line 164. Line 164, in turn, is coupled through line 166 to the positive input of a comparator stage 168. Stage 168 is coupled with ground line 54 through resistor R20 as well as line 170 and to +5 v supply through line 68. The negative input terminal of comparator 168 is coupled through line 172 and line 174 to a divider network including resistors R18 and R19. Line 174 incorporating this network extends to the positive terminal of battery 50. Accordingly, the adjusted voltage value at line 172 represents the instantaneous battery voltage, while the voltage at line 166 represents a regulated supply for comparison with the voltage level at line 172. When the voltage level at line 172 falls below that at line 166, then the output of comparator 168 at line 176 becomes a logic high. This logic high is received at line 178 which, referring to FIG. 2A, extends through diode D9 to the base of a transistor Q6 within a transistor network so identified. The collector of transistor Q6 is coupled through diode D10 to terminal R0 of integrated circuit 126 via line 180 and the emitter component thereof is coupled via line 142 to the earlier discussed terminal R6. Accordingly, current is permitted to flow from terminal R0 through transistor network Q6 to terminal R6 during the appearance of a negative pulse at the R6 terminal. This is a requirement for generating a low battery alarm signal. Note that line 180 is coupled with the pull-up resistors within grouping 144 thereof. Additionally it should be observed that terminal R6 is similarly coupled with pull-up resistors within a grouping 182.

Simultaneously with the generation of a low battery signal at line 178, a START signal is applied to the corresponding terminal of integrated circuit 126. Looking to FIG. 2B, it may be observed that the logic high signal at line 176 from comparator 168 which represents a low battery condition is inverted at inverter 184 and directed along line 112 to NAND gate 114 (FIG. 2A). The resultant input to gate 114 provides a start signal through gate 122, line 124 and resistors R9 and R10.

Returning to the integrated circuit 126 shown in FIG. 2A, it may be observed that a DIP type switch assemblage (dual in line package) 186 is associated between terminals R0–R3 and R8–R9 of that circuit. These switches are adjusted to provide the digital account or facility code utilized in conjunction with the transponder 8. For example, each user will have a unique code which is recognized by that transponder. Circuit 126 responds to this adjustable hard wiring coded input to transmit that code in connection with the transmission of any security alarm (zone information). Circuit 126 is reset or initialized from line 188 at the commencement of any power up procedure associated with changing the battery or the like. In this regard, looking additionally to FIG. 2B, it may be observed that line 188 extends to a small RC network including capacitor C6 and resistor R21 which is powered between the +5 v rail 60 and line 56. A diode D15 serves to discharge capacitor C6 upon battery removal.

When the circuit 126 has been initialized, and a form of alarm has been received as determined by the input to transistor networks Q4 or Q6, then a pulse or logic low of relatively lengthy duration, for example about 8 seconds required for transmission, is developed at line 192. Line 192 extends to the base of the PNP transistor Q7 of the transistor network. The emitter of transistor Q7 is connected through line 194 to battery level voltage at line 52, while the collector thereof is connected through line 196 and resistor R22 to an oscillator circuit comprised generally as a tank circuit including inductive components 198 operating in conjunction with NPN transistor Q8, the base of which is driven by a crystal oscillator 200. Inductive components 198 operate in concert with capacitor C7 within line 202 and resistors R23–R25. The oscillator serves to generate a 49.86 MHz output which is coupled through capacitor C9 to the base of NPN transistor Q9. The emitter of transistor Q9 is coupled via line 206 to ground line 56, while the collector thereof is coupled through line 208 to a folded dipole transmitter antenna 210. The opposite side of antenna 210 is connected via line 212 and capacitor C10 to line 208.

Figure 4:
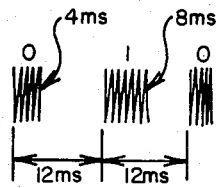
FIG. 4 is an idealized representation of the pulse width modulation arrangement of the transmitters utilized with the system of the invention.
Figure 3:
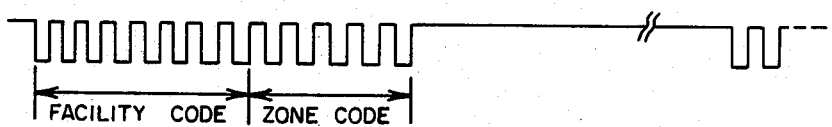
FIG. 3 is an idealized representation of the pulse output of a transmitter according to the invention.

Transistor Q9 serves to modulate the signal applied to antenna 210 and this is accomplished by the logic output of terminal R5 of integrated circuit 126 as is provided at line 214. The coded output at line 214 is of a pulsed or digital variety generally having a length of 18 bits. Looking momentarily to FIG. 3, the first eight bits of the transmitted word will be a facility or house (account) code, followed by a five bit zone code identification of the particular alarm at hand. For transmitter 10, this identification will be of low battery, intrusion or heat. Additionally transmitted will be a start pulse and a parity bit. FIG. 4 shows the form of pulse modulation, it may be observed that the RF signal is essentially 100 percent amplitude modulated and the width thereof will determine the presence of either a logic 0 or logic 1. FIG. 4 shows that for any 12 m.s. pulse envelope, a pulse width of about 4 m.s. will represent a logic 0, while within the same 12 m.s. envelope, an 8 millisecond transmission will represent a logic 1.

Figure 1A:
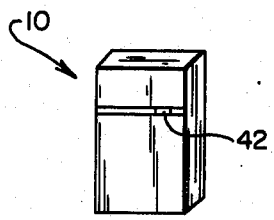
FIG. 1A is a perspective view of a transmitter utilized in the system of the invention.

Returning to FIG. 2B, it may be observed that transmission control from terminal R5 at line 214 is directed to a transistor network including PNP transistor Q10, the emitter of which is coupled through line 216 to line 52, and the collector of which is coupled via line 218 incorporating resistors R27 and R28. In the arrangement shown, transistor Q10 serves to turn transistor Q9 on and off in accordance with the pulse width modulated code. Additionally, the collector of transistor Q10 is coupled through line 220 to LED 42 positioned upon the housing of transmitter 10 (FIG. 1A). The cathode of diode 42 is connected via line 222 and resistor R29 to line 56. Thus, the LED 42 will be energized in correspondence with the transmitted code.

The transmitter circuit also contains a diode D16 coupled within line 224 for the purpose of preventing damage to the circuit in the event the battery 50 is coupled with improper polarity and a capacitor C11 is provided within line 226 extending between lines 52 and 56 for filtering purposes.

Personal Emergency-Convenience Transmitter

As indicated above, the personal emergency or convenience transmitter is small, hand-held or pocket/belt carried by the user and can be used to transmit a zone code either for the purpose of disarming the transponder upon re-entry into the home or for the purpose of broadcasting an emergency such as a heart attack, hold-up (panic) or similar medical problem. With the exception of the technique for generating an alarm signal and the illumination of a low battery indicator, the circuit for the instant transmitter is quite similar to that described in conjunction with FIGS. 2A–2B.

Figure 5:
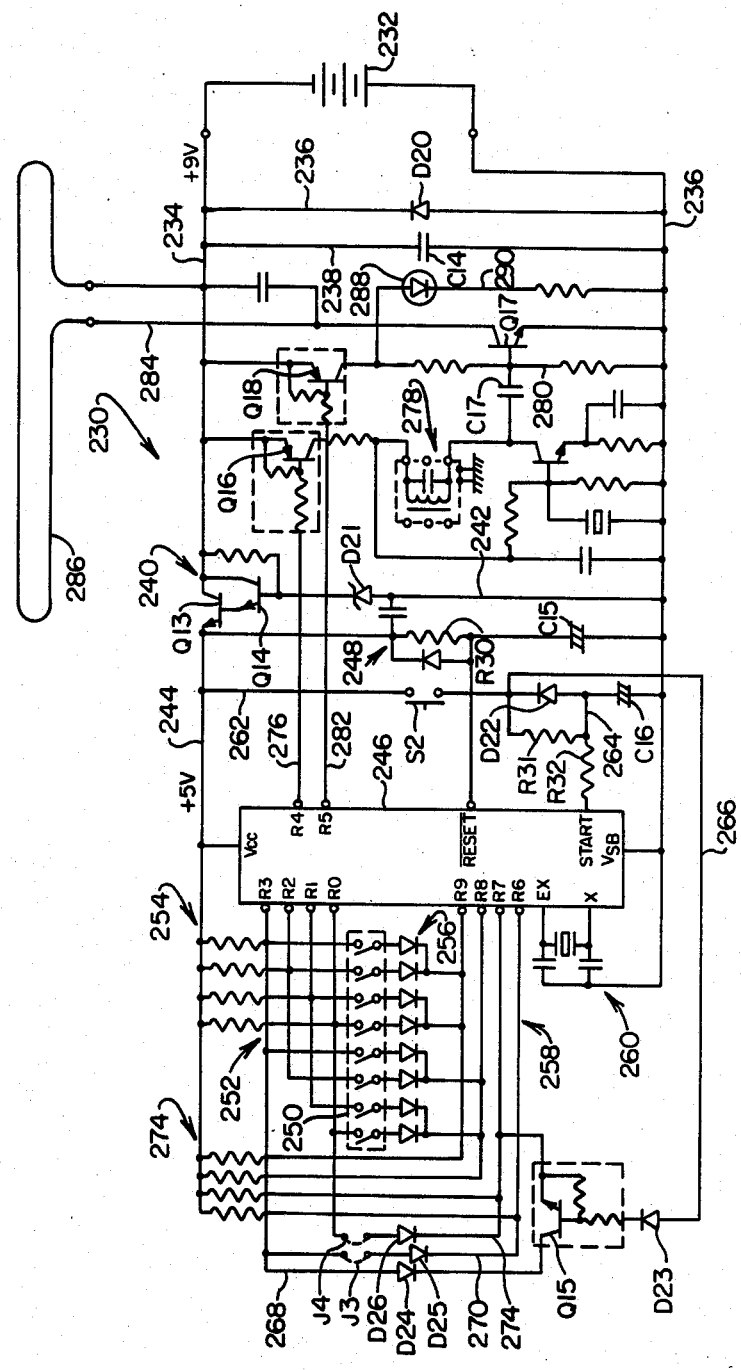
FIG. 5 is a schematic electrical diagram of another transmitter utilized with the system of the invention.

Referring to FIG. 5, the convenience-personal emergency transmitter is represented in circuit fashion generally at 230 and is seen to incorporate a battery power supply 232 which is coupled to power lead 234 to provide a +9 v supply as well as to ground lead 236. As before, a diode D20 within line 236 serves to prevent inadvertent polarity reverses in changing battery 232, while a capacitor C14 and line 238 serves a filtering function. The voltage stabilizer or regulator network including Darlington transistor pair Q13 and Q14 in combination with Zenner diode D21 within line 242 extending from the base of transistor Q14 to line 236 provides a regulated 5 v logic supply voltage at rail or line 244.

Circuit 230 operates in conjunction with an integrated circuit 246 identical to that at 126 in FIG. 2A, circuit 246 being reset, as before, by an RC network including resistor R30 and capacitor C15. Circuit 246 is programmed for facility or house code transmission in the same fashion as circuit 126 by a DIP switch array 250, the inputs to which are connected by line network 252 both to terminals R0–R3 of circuit 246 and through pull-up resistor grouping 254 to line or rail 244. The outputs of the switches within array 250 are coupled through diode array 256 and line array 258 to the R8 and R9 terminals of integrated circuit 246. As before, the house (account) or facility code programmed through actuation of the switches 250 is read by the circuit 246 to produce a house or facility code for transmission from terminal R5 in the event of an alarm condition. Circuit 246 additionally is driven from a clock network 260 which provides a 1 MHz oscillatory input to the X and EX terminals thereof. Note that the latter network 260 is coupled to line 236.

A transmission is made from circuit 230 by the user actuating switch S2 which is positioned within line 262 extending from line 244 to line 236. Line 262 also includes a diode D22 and capacitor C16 and is coupled via line 264 from a point intermediate the latter two components to the START terminal of integrated circuit 246. When switch S2 is depressed, capacitor C16 is charged through a resistor R31 extending about diode D22 and to the capacitor through line 264. As the voltage at capacitor C16 reaches a threshold voltage for the circuit 246, the latter circuit is activated.

The foregoing actuation of switch S2 by the user further activates to switch on a detection circuit including a network having an NPN transistor Q15 therein. In this regard, the +5 v signal occasioned with the closure of switch S2 is directed along line 266 and through diode D23 to the base of transistor Q15. This biases transistor Q15 on which, in turn, effects the communication of terminal R3 of circuit 246 via line 268 and diode D24 to terminal R7.

Where a personal emergency function is desired, the start activation of circuit 246 also will effect communication between terminal R3 and terminal R6 via diode D25 and line 270. The activation of this personal emergency transmitter is determined by the presence or absence of jumper J3. In similar fashion, the presence of jumper J4 will provide communication between terminal R0 of circuit 246 through diode D26 and line 272 with terminal R7. This will provide information to circuit 246 to transmit a convenience code for purposes of facilitating disarming upon user entry into the facility monitored. As before, a grouping of pull-up resistors as at 274 is coupled with line grouping 258.

Upon receipt of an alarm signal emanating from the actuation switch S2, integrated circuit 246 provides a logic low pulse of extended duration at line 276 which turns on PNP transistor Q16 shown within a packaged network. Transistor Q16, in turn, activates the oscillation network which is identical to that described in conjunction with FIG. 2B and is shown generally at 278. Network 278 develops an oscillatory output at the earlier noted 49.86 MHz frequency which is coupled through capacitor C17 to line 280. Line 280 is coupled to the base of NPN transistor Q17 in a controlling relationship and, in turn, is controlled from PNP transistor Q18. Transistor Q18, as before, is modulated on and off to develop the earlier-described pulse width modulated codes via terminal R5 of circuit 246 and line 282. The collector of transistor Q17 is coupled through line 284 to a folded dipole transmission antenna 286. Simultaneously, LED 288 within line 290 is energized.

The output circuit 230 is provided such that a facility or house code first is transmitted followed by a zone code indicating that a disarm procedure should be carried out or that a medical emergency or the like is at hand. The form of code output has been described in conjunction with FIGS. 3 and 4 above.

The circuit 230 also may be incorporated with a conventional or customized smoke detector, such implements generally having an on board low battery detector such that that feature may not be required for that detection function.

Master Console-Transponder

Figure 6B:
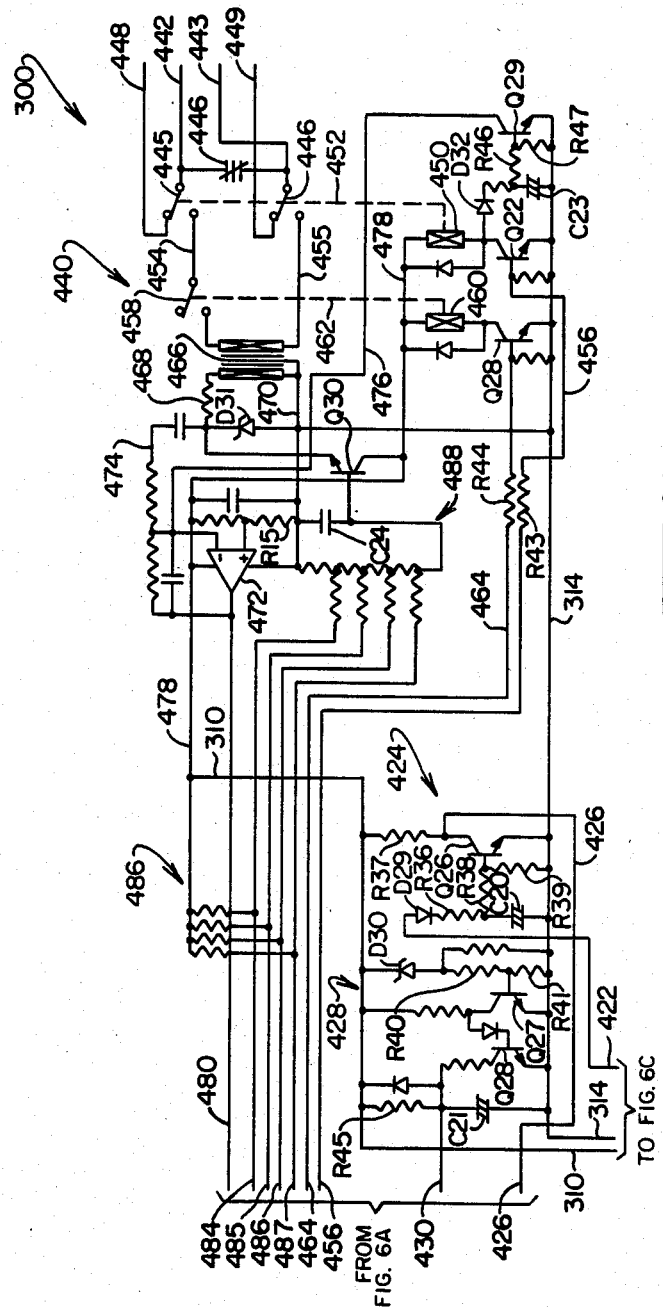
Figure 6C:
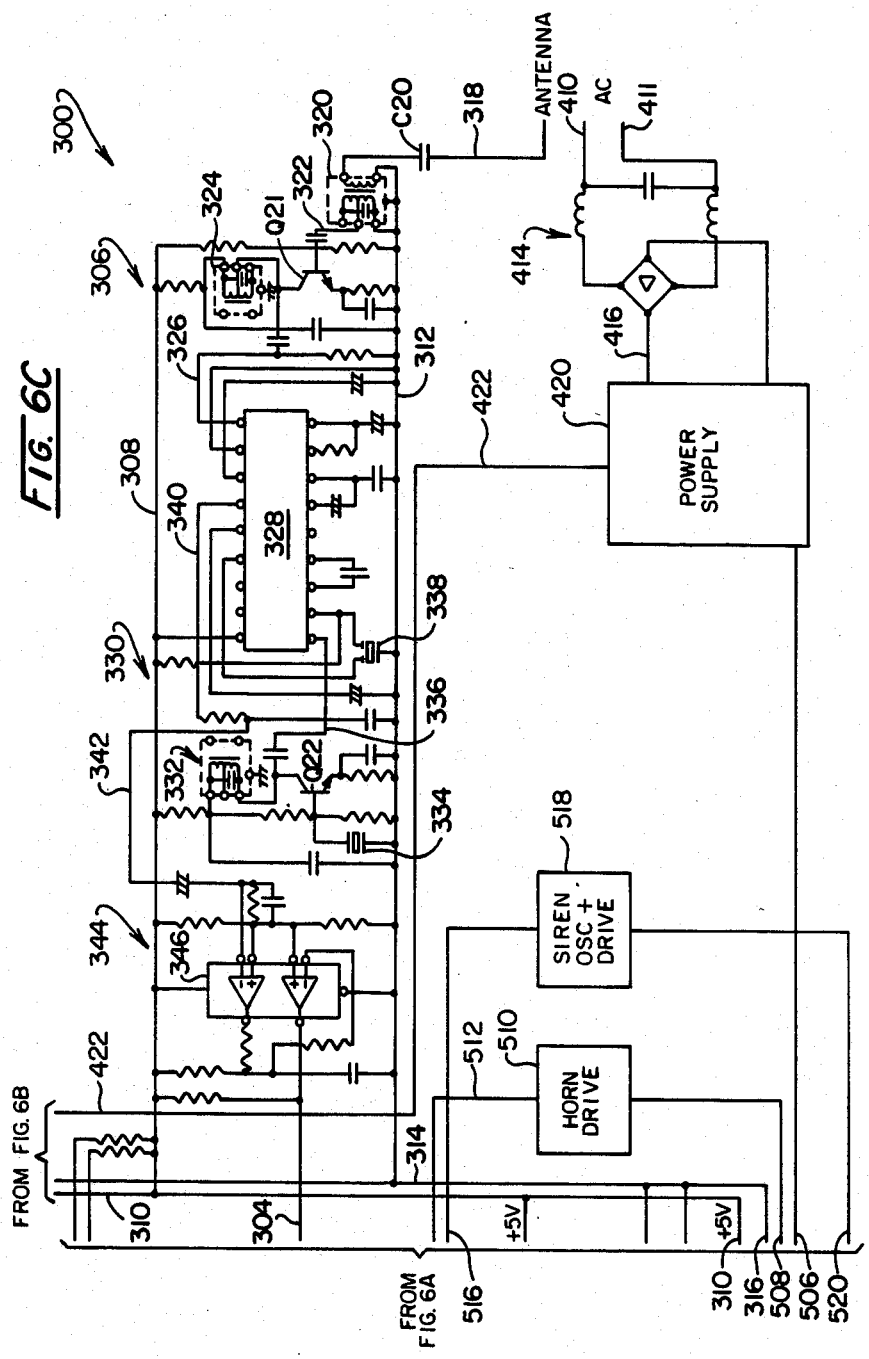

Referring to FIGS. 6A-6C, the general circuit structure for the transponder function is revealed generally at 300. The figures should be arranged as labelled such that FIG. 6B is positioned immediately above FIG. 6C and FIG. 6A is positioned immediately to the left of FIGS. 6B and 6C while in their noted vertical arrangement.

Circuit 300 is microprocessor based and, accordingly, utilizes a microprocessor 302 (FIG. 6A) which may be, for example, a type M50741-800SP marketed by Mitsubishi Electric Company. Circuit 302 receives a treated coded serial data signal from the above-described transmitters at its input port Ro at line 304. Looking to FIG. 6C, line 304 is seen to represent the output of a receiver circuit represented generally at 306. Circuit 306 receives a +5 v power supply from along line 308 extending from line 310 and utilizes a ground input at line 312 which extends from lines 314 and 316. Transmissions to the circuit 300 are received at a receiver antenna which, as indicated above, may be provided as part of the a.c. power cord. Pulse width modulated coded serial data signals are conducted via line 318 and coupled by capacitor C20 to the input of receiver circuit 306. The signals first encounter a tuned, impedance matching circuit 320, the output of which at line 332 is capacitively coupled with the base of an NPN transistor Q21. Transistor Q21 performs as a resonance form of amplifier, the collector thereof being coupled to another resonating oscillatory network 324, the emitter thereof being coupled through a parallel resistor-capacitor network to line 312. The output of this amplification stage is capacitively coupled through line 326 to one input terminal of an integrated circuit 328 which serves a conventional mixer function. Circuit 328 may be provided, for example, as a type SL6700C. Also supplied to circuit 328 is the 49.405 MHz output of a local oscillator represented generally at 330 which operates in similar fashion as network 278 described in conjunction with FIG. 5. In this regard the network 330 includes an inductive component 332 coupled with the collector of transistor Q22 as well as a crystal oscillator 334. The output of the network 330 is provided at line 336 extending to another input of circuit 328. Circuit 328 also receives an input from crystal 338 (intermediate frequency crystal) and in conventional fashion, operates as a 455 KHz band pass filter. The demodulated output of the resultant circuit at line 340 extends through line 342 to the input of a pulse shaping network shown generally at 344. Network 344 is required inasmuch as the pulse train at line 342 is somewhat unshaped for purposes of submittal to the microprocessor circuit 302. Shaping of the pulses is carried out by a "double decker" operational amplifier structure 346 connected between lines 308 and 312. The output, now representing a pulse width modulated coded data train is submitted to circuit 302 from line 304.

Returning to FIG. 6A, the connections leading to arm switch 40, away switch 29, home switch 28, test switch 26, and reset switch 27, respectively, are represented at lines 348–352, a common, C, being shown at line 370. These lines 348–352 are coupled through diodes and with pull-up resistors from grouping 354 thereof to encoding terminal P10–P15 of circuit 302. Note that resistor grouping 354 is supplied +5 v power from line 310. Thus, the microprocessor 302 is capable of sampling the conditions of these switches. Additionally, terminals P10–P17 are coupled through an array of 8 diodes and DIP switches 358 to the P0$_o$ input terminal of circuit 302. With this arrangement, the circuit may sample the condition of each switch to determine the facility or house code which is arranged to match that of the transmitters. Two further diodes and associated switches as at 360 are utilized in conjunction with line 362 leading to terminal P0$_2$ of circuit 302 to provide an election between touch tone and dial pulse communication for circuit 300. Finally, the earlier described silent hold-up switch is shown in the figure at S3 being coupled with terminal P14 of circuit 302 from lines 364 and 366. The opposite output of switch S3 at line 368 is directed to terminal P0$_1$ of circuit 302 for response thereto. External monitoring is carried out by circuit 302 with respect to the screw terminals of the console 8 through lines 372–374 which extend from respective terminals P14–P12 to the noted externally coupled or hard wire devices.

Circuit 302 is supplied a clock input from a 4 MHz crystal input network shown at 376. This network is coupled to instrument ground via line 316.

The selective energization of the visual indicators of the transponder 8 is provided from circuit 302 in conjunction with terminals P20–P27. These terminals are coupled by an array of leads shown generally at 378, each of which is coupled to a pull-up resistor within a grouping thereof 380. Resistor grouping 380 is supplied +5 v voltage in a selective manner from line 382. Each of the lines within array 378 extends through a buffer of a grouping thereof 384 and the outputs thereof at line array 386 lead to the labelled illumination devices, to wit, low battery, emergency, fire, intrusion, test, home, away, and set or status. Buffer grouping 384 is shown coupled via line 388 to ground line 316.

Terminals P20–P27 also are shown to be coupled through lead array 390 to respective address ports A0–A7 of a programmable read only memory (PROM) 392. The outputs of PROM 392 at terminals Q0–Q3 are shown coupled through lead array 394 to respective terminals P30–P33 of circuit 302. Ground connection to PROM 392 is via line 396 extending from line 316. PROM 392 may, for example, be provided as a type TBP24S10.

The data retained in PROM 392 are accessed in a manner conserving power consumption with the instant circuit. In this regard, when a signal is received requiring the energization of a lamp or the like, terminal P03 assumes a logic low state. Terminal P03 is coupled through line 398 and base resistor R33 to the base of a PNP transistor Q24. The emitter of transistor Q24 is coupled to +5 v from lines 400 and 310, while the collector thereof is directed to ground line 316 through line 402. As line 398 assumes a logic low, transistor Q24 is drawn on to supply common ground through line 404. During this interval, a second PNP transistor, Q25 is in an off state by virtue of the high logic level asserted at its base from line 400. However, as microprocessor 302 accesses PROM 392, terminal P03 assumes a high logic level, transistor Q24 turns off and, in consequence, transistor Q25 turns on. As transistor Q25 turns on, +5 v power is supplied to PROM 392 through line 406. Referring to FIG. 6C, the a.c. input to circuit 300 is provided through leads 410 and 411. This a.c. input is fully rectified by a full wave bridge network represented generally at 414 so as to provide a d.c. output at lines 416–417. Outputs 416–417 are directed to a power supply of conventional structure represented by block 420. The d.c. level as derived from network 414 is tapped from power supply 420 via line 422 and directed to a low battery detection circuit represented generally in FIG. 6B at 424. As indicated earlier herein, inasmuch as nickel cadmium permanent batteries are utilized with circuit 300, the detection of a voltage fall-off becomes quite difficult. Accordingly, a three hour time-out is utilized which commences with the loss of a.c. power at liens 410–411. Referring to FIG. 6B, network 424 is seen to receive the d.c. level, a.c. input responsive power supply from line 422 which is directed through diode D29 and resistor R36 to capacitor C35. Capacitor C35 is charged to voltage at d.c. line 422 during a period when a.c. power is normally on. During this same period, an NPN transistor Q26 will be biased forwardly to an on condition. The collector of transistor Q26 is coupled through resistor R37 to line 310 carrying +5 v, while the emitter thereof is coupled to line 314. The collector of transistor Q26 also is coupled through line 426 to the R1 terminal of microprocessor 302 (FIG. 6A). Accordingly, the logic level during the presence of a.c. power at line 426 is low to preclude the activation of any low battery alarm.

In the event that power at a.c. input 410–411 is lost, capacitor C20 will discharge through resistors R38 and R39 over a period of about 3 hours until such time as the forward bias asserted at the base of transistor Q26 is lost. Upon this occurrence, line 426 transitions to a logic high and a corresponding low battery signal is asserted at terminal R1 of the microprocessor 302.

A reset network shown generally at 428 in FIG. 6B also is activated at such time as a power loss occurs at the +5 v logic supply derived through line 310. In this regard, line 310 is coupled through Zenner diode D30 and a divider resistor pair R40 and R41 to NPN transistor Q27. Transistor Q27 is normally forwardly biased but is turned off in the presence of a lower voltage level at line 428. As transistor Q27 is turned off, another NPN transistor Q28, the base of which is coupled to the emitter of transistor Q27, is turned on. In consequence, line 430 extending to the reset terminal of microprocessor 302 goes to a logic low to cause a resetting condition to occur. Similar to the circuits described in conjunction with FIGS. 2A–2B and FIG. 5, an RC circuit including resistor R42 and capacitor C21 additionally provides a low logic level at time 430 to carry out the aforesaid resetting function.

FIG. 6B also reveals a communicator network for utilization in siezing a telephone service to the user facility and carrying out automatic dialing to the security monitoring service. In this regard, the incoming telephone line, ie. tip and ring are shown at lines 442–443. These lines are joined through a protective thyrister 446 and extend to the respective normally closed contacts 445 and 446 of a relay switch, which, in turn, provides normal contact with respective facility telephone lines 448 and 449. Contacts 445 and 446 are actuated from their normally closed orientation as shown by the energization of a relay coil or winding 450, the association between coil 450 and contacts 445–446 being represented by dashed line 452. Thus, with the energization of coil 450, contacts 445–446 are drawn into contact with respective lines 454–455 to carry out seizure of the telephone communication. Relay coil 450 is energized in consequence of the turning on of NPN transistor Q22, the emitter of which is coupled to ground line 314, while the collector thereof is coupled with the coil 450. The base of transistor Q22 is coupled through base resistor R43 within line 456 to terminal P35 (FIG. 6A) of microprocessor 302. Accordingly, a positive going pulse from that terminal will carry out the seizure of the telephone system.

Returning to FIG. 6B, it may be observed that line 454 extends through the switch 458 of another relay, the coil or winding of which is identified at 460. The association between coil 460 and switch 458 is represented by dashed line 462. Coil 460 is energized in consequence of the turning on of NPN transistor Q28. The collector of transistor Q28 is coupled with coil 460, while the emitter thereof is coupled to ground line 314. The base of transistor Q28 is coupled through resistor R44 and line 464 to terminal P34 of microprocessor 302 (FIG. 6A)

and the actuation of switch 458 from that terminal carries out pulse type dialing. Diodes are shown in shunt about both coils 450 and 460 for the conventional purpose of avoiding inductive kick-back.

Lines 462 and 454 are, in conventional fashion, coupled into circuit 300 through an isolation transformer 466, the input side to which is provided at lines 468 and 470. A Zenner diode D31 extending therebetween performs a voltage limiting function. Line 470 is directed through resistor R45 to the positive input of an amplification stage 472. The opposite or negative input to stage 472 is seen to extend not only from line 468 via line 474, but also to include a coupling with line 476. Line 476, in turn, extends to the collector of an NPN transistor Q29, the emitter of which is coupled to line 314 and the base of which is connected through resistors R46 and R47 to an RC circuit comprised of relay winding 450, diode D32 and capacitor C23. Capacitor C23 is charged to the 5 volt level provided from line 310 through line 478 and winding 450 before the activation of transistor Q22. As transistor Q22 is turned on, its collector assumes a 0 voltage level at which time, capacitor C23 becomes isolated from the 5 volt voltage supply at line 478 in consequence of the positioning of a diode D32. The capacitor C23 then commences discharging in consonance with a time constant constituted by resistors R46 and R47. This discharge is slow enough to maintain transistor Q21 in a forward biased state for about 1½ seconds constituting the desired dialing delay following the receipt of a dial tone from the telephone service. This dial tone is transmitted from the telephone service through amplification stage 472 and line 480 to the interrupt terminal of microprocessor 302 (FIG. 6A).

Where touch tone dialing is elected by the user entity, then a digital output is presented from microprocessor 302 at its terminals P04–P07 as represented at respective lines 484–487. These lines are coupled with pull-up resistors as shown at grouping 486 which, in turn, are coupled to +5 v supply line 478. Lines 484–487 will carry appropriate 4-bit coded telephone dialing signals which are presented to a digital-to-analog ladder type converter represented generally at 488. Operating in concert with capacitor C24 and stage 472, the converter 488 derives dual frequency audio tones by the excitation of NPN transistor Q30. Note that the emitter of transistor Q30 is coupled with line 468, while the collector thereof is coupled with +5 v supply line 478.

Figure 7:
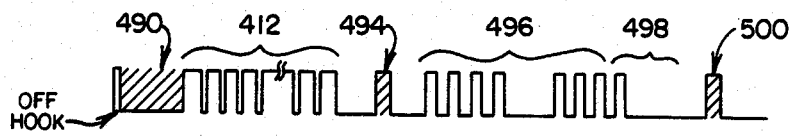
FIG. 7 is a stylized and exaggerated diagram illustrating the transmitter circuit output of the transponder of FIGS. 6A-6C.

Looking momentarily to FIG. 7, the interactive accessing process between circuit 300 and the security monitoring service is represented in diagrammatic form. In the figure, the 1½ second delay interval following off hook and receipt of dial tone is represented by the cross hatched region 490. Following this period, as shown schematically by the pulse region 492, the security monitoring service telephone number is dialed either by dial pulse or touch tone procedure, following which an acknowledgment tone represented at 494 is transmitted to transponder 8. This tone sometimes is referred to as a "hand shake tone". Following receipt of tone 494, the transponder circuit 8 carries out automatic transmission of the account number or facility code as represented at 496, followed by a zone code or alarm type code a represented at 498. Following the transmission of such codes, an appropriate recognizable number of times (preferably two times), then the security monitoring service will log off by submitting a tone as at 500, sometimes referred to as a "kiss off" tone.

Looking to FIG. 6A, additional outputs of circuit 300 are repesented. For example, +5 v voltage supply line 310 and ground line 316 are shown respectively coupled with lines 502 and 504 which are directed to the clock output 36 as shown in FIG. 1. Illumination of the visual indicator 16 is provided via line 506 which extends to power supply 420. Additionally, line 508 is shown directed to a horn drive or piezoelectric crystal drive network 510 (FIG. 6C) which, in turn, is coupled through line 512 to terminal P36 of microprocessor 302 (FIG. 6A). An opposite input to this piezoelectric drive which is positioned adjacent openings 30 in housing 12 is provided from the +5 v supply line 310 as it is coupled thereto through line 514. As is apparent, enablement of the horn or audible alarm is made from terminal P36 and line 512 to the horn drive network 510 whereupon the device is actuated from lines 508 and 514.

In similar fashion, terminal P37 of microprocessor 302 is coupled by line 516 to a siren oscillator and drive represented at block 518. The output of drive network 518 is repesented at line 520 which extends as shown in FIG. 6A to the external terminals of transponder 8. This terminal grouping is represented in general at 522.

Security Monitoring Service

Figure 8:
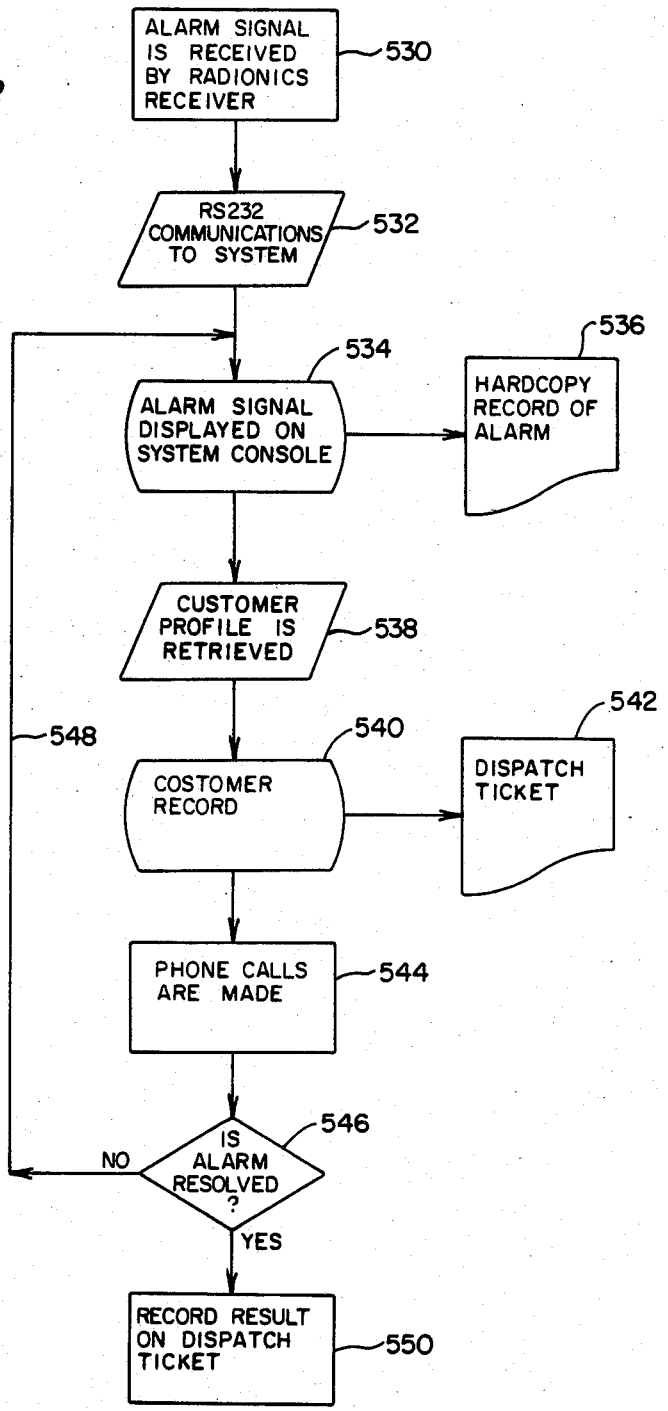
FIG. 8 is a flow chart describing the operation of security monitoring service portion of the system of the invention.

Referring to FIG. 8, a flow chart is revealed showing the general operation of the security monitoring service to which the telephonic transmissions of transponder 8 are made. This service will be provided within a region convenient to the user and will generally be computerized, for example, utilizing, as hardware, redundant Data General Models 20 and 30 systems. When an alarm signal is received at a receiver of the service, using RS232 interface type of component association, an alarm signal will be received as represented at block 530. The RS232 communication to the system then is represented at block 532, whereupon the transmitted alarm signal is displayed at a screen for the operator. This signal will include the account or facility identification code, the type of alarm, the time and the date. Such information is represented at block 534. The computer system then will prepare a hard copy record of that alarm as represented at block 536. The operator then retrieves the customer profile or information record to determine the proper instructions for any given emergency. For example, this record will include the identification of the user as well as the proper telephone numbers for emergency calls. Any other special instructions will be provided, for example in the event of a small business fire, the type of materials to be used to extinguish such fires. Retrieval of the user or customer profile is represented at block 538. This customer record is represented at block 540 and the computer then will prepare a dispatch ticket with all pertinent information utilized from the record as is represented at printout symbol 542. The monitoring service personnel then make a phone call to the user to ascertain that an emergency is at hand as represented at block 544. This will either confirm a false alarm or that additional steps including the contacting of appropriate authorities is to be made. The inquiry thus represented is depicted at block 546. Where resolution as to whether further action should be taken is not made, then as represented by loop line 548, the procedure is repeated. Where the alarm signal or emergency condition is taken care of, then as represented at block 550, the results are recorded for permanent filing and the making of appropriate records for the user. Generally, an uninterrupted power supply is utilized with the security monitoring service as well as cartridge back-ups and the like to retain records constitute a portion of this facility.

Control Program

Referring to FIG. 9A, the general program under which microprocessor 302 (FIG. 6A) performs is revealed in flow chart format. The program commences with a conventional initialization procedure as represented by the START terminal 560. Additionally at start-up, the program carries out a verification of any transmitted house code from transmitter as at 10. This verification is carried out by comparing the transmitted code with the data inserted by switches 358 (FIG. 6A). Where the codes are not identical, transpondrer 8 will not react. Following such initialization, as represented at decision block 562, an initial inquiry is made as to whether the silent hold-up switch has been actuated. In the event that it has, then as represented by line 564 leading to node A, the program will be seen to immediately undertake a telephone number call subroutine for making contact with the security monitoring service. In the event the inquiry at block 562 results in a negative answer, then as represented by question block 566, an inquiry is made as to whether the transponder is in an idle mode. If the answer is in the affirmative, the mode of the transponder 8 is either an idle one or the idle mode is occurring during the timeout, ie. 45 seconds occasioned by arming in an away switch 29 actuation procedure. The idle mode will cause the setting of an intrusion inhibit flag as represented at block 568, a condition wherein the transponder 8 will not respond to intrusion signals. Following setting of the intrusion flag, the program progresses to the inquiry at block 570 wherein a determination is made as to whether the away intrusion procedure has been carried out. In the event that it has, then as represented at block 572, the reset switch inhibit flag is set. This procedure provides for the disabling of the operation of reset switch 27 under conditions in which the transponder 8 is armed. The program then looks to the inquiry represented at block 573 where a determination is made as to whether a transmission has been received from an operator actuated convenience transmitter. Such broadcast replaces a disarm actuation at switch 40 by causing the program to revert via line 575 to its block 570 position. Following termination of transmission from the convenience transmitter, the system remains armed in an away mode.

In the event of a negative response at block 566 indicating the presence or absence of an idle mode or a negative response at block 570 determining whether or not an away procedure has been carried out or a negative response at block 573, then as represented at line 574 and 577 the program diverts to node B, continuing the program at FIG. 9B. Looking to FIG. 9B, the program then progresses to the inquiry at block 576 determining whether or not the test switch 26 has been actuated to develop a test mode operation. In the event of an affirmative response, as represented at block 578, inhibit flags are set for the intrusion, fire, emergency and low battery conditions. This will inhibit the transmission of any such conditions to the security monitoring service, such that testing can be carried out. In the event the query at block 576 indicates that there is no test mode, then the transponder 8 will be operating in a home or away condition and as represented at block 582, an inhibit flag is set for reset switch actuation.

Figure 9C:
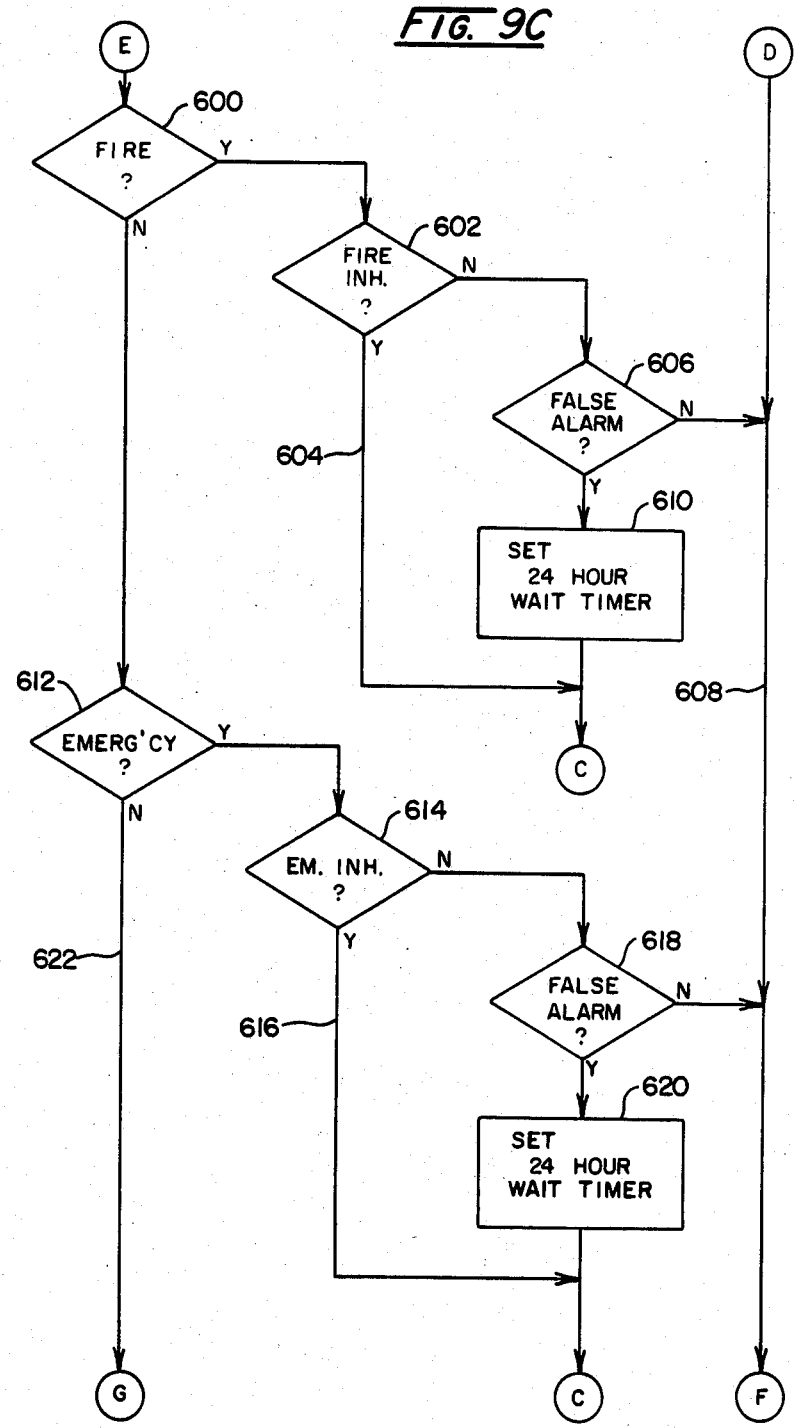

The program then proceeds to the inquiry represented at block 584 wherein a determination as to whether an RF transmission has been received from an associated transmitter such as that described at 10. In the event such transmission has been received, then as represented at inquiry block 586, a determination is made as to whether an intrusion zone has been received. In the event that such intrusion zone has been received, as represented at block 588, a determination is made as to whether the intrusion inhibit flag is on. This inhibit flag will be on in the event that an intrusion zone transmission has been received three times in an interval of one hour. In the event that the intrusion inhibit flag is on, then the program progresses to node C as described in connection with FIG. 9D.

Where the inquiry at block 588 indicates that the intrusion inhibit flag is not on, then as represented at block 590, a determination is made as to whether a false alarm is at hand, such alarm being constituted by the noted third in a sequence of intrusion zone transmissions within a period of one hour. In the event that a false alarm indication is at hand, then as represented at block 592, a 24 hour delay timer is set. With such an arrangement, the system will wait for that extended period of time before responding to an intrusion coded transmission. In the event that no false alarm is indicated in conjunction with the inquiry at block 590, then the program progresses to node D as set forth in FIG. 9C which ultimately leads to a subroutine providing for carrying out the dialing of the security monitoring service.

Where the inquiry at block 584 determines that no RF signal has been received, then as represented at inquiry block 594 a determination is made as to whether auxiliary zones 6, 7 and 8 have been activated. In the event they have not, then the program proceeds to node C as earlier described. It may be recalled that these auxiliary zones operate on the same basis as the silent hold-up switch program and concern hard wired sensing devices looking for flooding, pipe freezing, furnace failures and the like. In the event that the inquiry at block 594 indicates that such auxiliary zone is on, then as represented at block 596, a determination as made as to whether a serial transmission is at hand. Serial transmission involves a condition wherein more than one alarm zone code is to be transmitted. In the event the inquiry at block 596 is in the affirmative, then as represented at block 598, the program sets a serial transmission flag. A negative response to the inquiry at block 596 or subsequent to setting the serial transmission flag leads to node D, as earlier described, calling for the dialing of the security monitoring service.

Where the inquiry as to whether an intrusion is at hand at block 586 results in a negative determination, then the program proceeds to node E which continues to FIG. 9C.

Referring to FIG. 9C, node E shows the program progressing to the inquiry at block 600 determining whether or not a fire zone code has been received. In the event such code has been received, then as represented at block 602, an inquiry is made as to whether such fire zone inputs are inhibited and, in the event of an affirmative response, as represented at line 604, the program diverts to node C. Where the inquiry at block 602 indicates that the fire transmssion condition is not inhibited, then as represented at block 606, a determination is made as to whether a false alarm is at hand. Here again, where three such alarms are received within a predetermined interval, for example one hour, then the 24 hour waiting period is instituted. Where the inquiry at block 606 is in the negative, then as represented at line 608, the program diverts to node F which leads to a telephone number calling routine. Where the inquiry at block 606 is in the affirmative, a third fire transmission will have been received within a predetermined period, for example one hour, and the 24-hour wait timer is set. The program then diverts to node C.

Where the inquiry as to the presence of a fire transmission at block 600 is determined as negative, then as represented at block 612, a determination is made as to whether an emergency zone code has been transmitted. Where that inquiry results in an affirmative response, then as represented at block 614, a determination is made as to whether the inhibit flag is activated for emergency zone transmissions. Where that is the case, then as represented at line 616, the program diverts to node C. Where the inquiry at block 614 indicates that there is no inhibition of emergency zone transmission, then as represented at block 618, an inquiry is made as to whether a false alarm condition is at hand which, as before, involves the receipt of such zone transmission a predetermined number of times within a predetermined interval, for example three times in one hour. Where no false alarm is at hand, then the program diverts to line 608 and node F for entry into a telephone number dialing subroutine. Where the inquiry at block 618 indicates that a false alarm condition is at hand, then as represented at block 620, the 24 hour wait timer is set and the program diverts to node C. Where the inquiry at block 612 determining the presence or absence of an emergency transmission results in a negative response, then, as represented at line 622, the program proceeds to node G which commences at FIG. 9D.

Figure 9D:
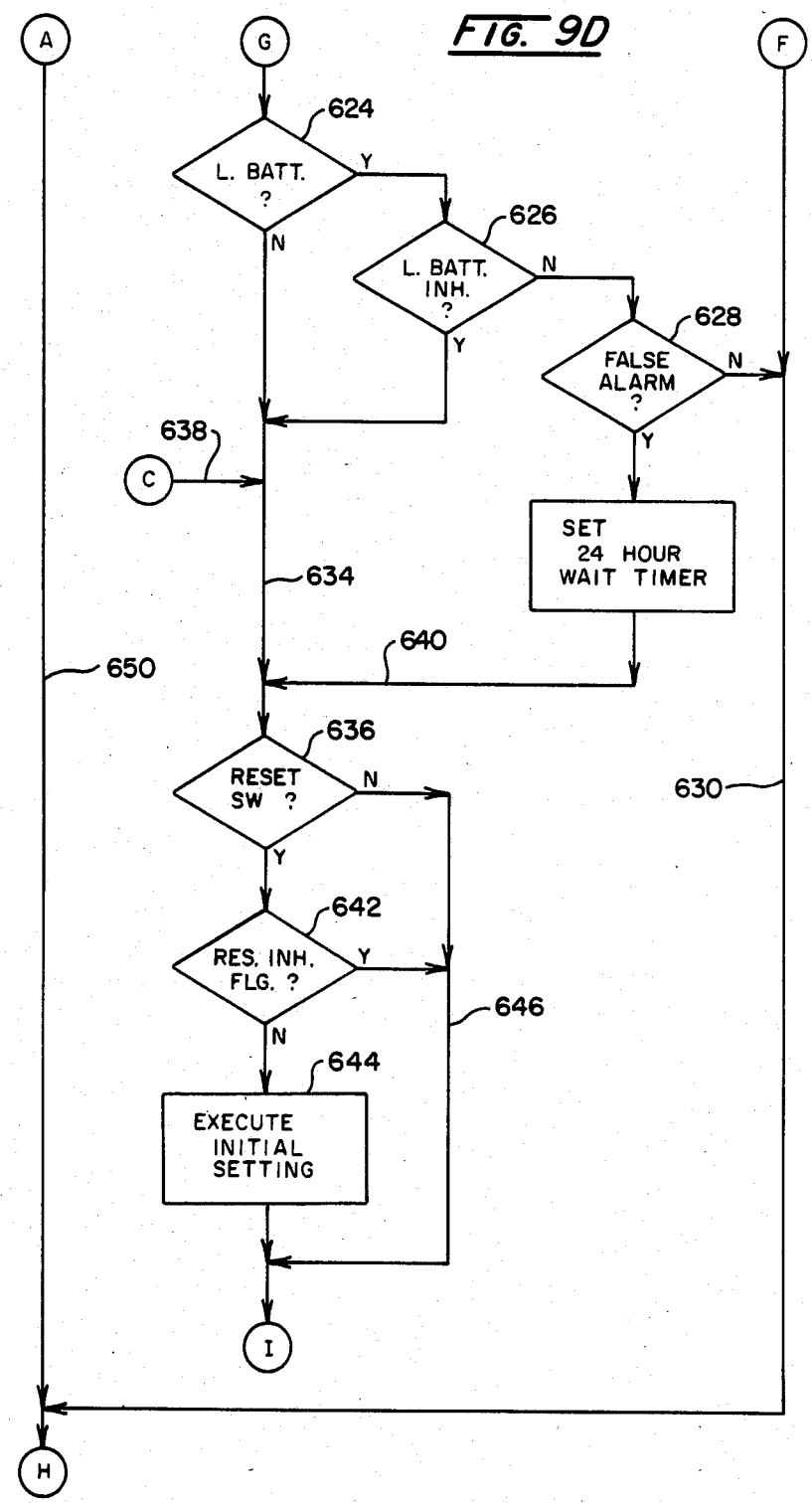

Referring to FIG. 9D, node G is seen to lead to inquiry block 624 at which position an inquiry is made as to whether a low battery zone transmission has been received. Where the inquiry results in a negative response, then as represented at block 626, an inquiry is made as to whether the low battery transmission has been inhibited. In the event of a negative response to this inquiry, as represented at block 628, a determination is made as to whether the low battery zone transmission has been received a predetermined number of times within a predetermined interval, for example three times in one hour, and in the event of a negative response to this inquiry, as represented at line 630, the program progresses to node H for carrying out the noted telephone number call subroutine. Where the inquiry at block 628 is in the affirmative, a false alarm condition exists and as represented at block 632, the 24-hour timer is set.

Returning to block 624, where the determination as to whether a low battery zone transmission has been received is in the negative, then as represented at line 634, the program proceeds to the inquiry at block 636. It may be noted that node C as earlier discussed in conjunction with the setting of the 24-hour timer functions, enters the program at this line 634 as does the output line 640 from block 632.

The inquiry at block 636 is to determine whether or not the reset switch has been actuated. In the event that this switch 27 has been actuated, then as represented at block 642, a determination is made a to whether the reset inhibit flag is on. In the event that this flag is not on, then as represented at block 644, the transponder 8 carries out the executed setting by energizing a visual indicator such as a lamp LED or the like and/or actuating an audible alarm thus may be required.

Where the inquiry at block 636 is in the negative, then as represented at line 646, the program reverts to node I which will be seen to commence the program again as represented at line 648 in FIG. 9A. Similarly, an affirmative response to the inquiry at block 642 as to whether the reset inhibit flag is on reverts the program to this node a represented at line 646. FIG. 9D additionally shows node A leading via line 650 to node H which continues the program at FIG. 9E.

Referring to FIG. 9E, node H is seen to lead to the telephone number call subroutine represented at block 652. This subroutine which is discussed in detail later herein, carries out the dialing and access of the security monitoring service as discussed in connection with communicator network 440 (FIG. 6B). The program then proceeds to the inquiry at block 654 determining whether or not an error flag has been set. In such event, as represented by line 656 and block 658, a one hour delay is entered. In the event no error flag is on, then as represented by subroutine block 660, the account or facility number and zone or alarm code are communicated to the security monitoring service. Following this transmission, as represented at block 662, the relay winding 450 is energized to cause switches 445 and 446 to assume their normal position permitting normal telephone operation in the facility. Following this activity, as represented by line 664 and node I, the program returns to its commencement position as indicated at FIG. 9A.

Figure 10A:
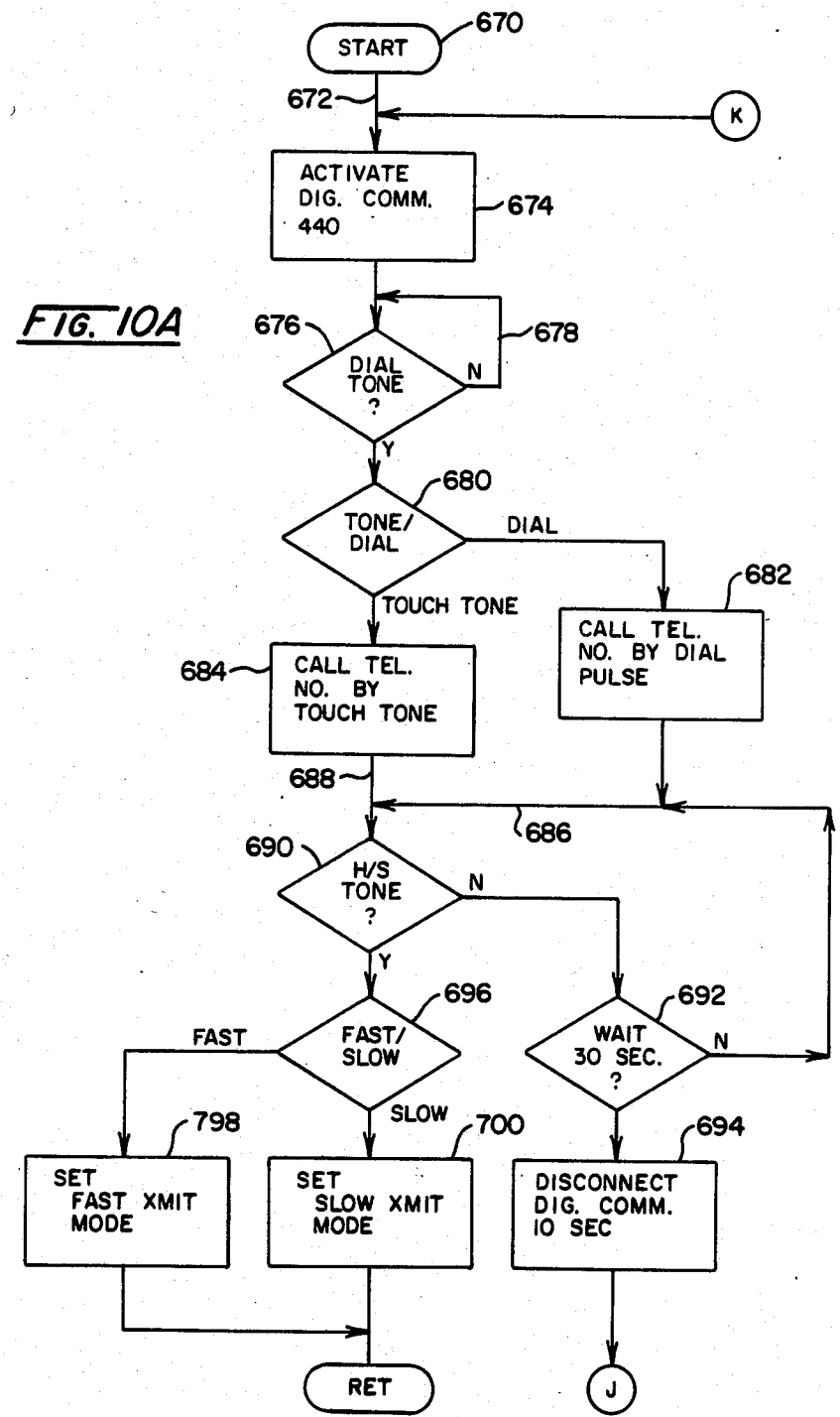

Referring to FIG. 10A, the telephone number call subroutine as referred to at block 652 in conjunction with FIG. 9E is revealed in enhanced detail. This subroutine commences at starting terminal 670 leading to line 672. Line 672 is shown leading to block 674 which provides for the activation of the digital communication network 440 as discussed in connection with FIG. 6B. Following activation of this network including the energization of winding 450 to carry out line seizure, the program commences to the inquiry at block 676. At this position, the determination is made as to whether a dial tone has been received in connection with the telephone service accessed. In the event no dial tone has been received, then as indicated by loop line 678, the system waits until such time as there is a dial tone. The program then proceeds to the inquiry at block 680 wherein a determination is made as to whether DIP switches 360 (FIG. 6A) have been set for touch tone or pulse dialing. In the event that a dialing arrangement has been elected, then as represented at block 682, winding 460 is pulsed to carry out dialing. On the other hand, where touch tone access has been elected, then as represented in block 684, access is made by touch tone procedure. Following either procedure as represented at blocks 682 or 684, as represented by lines 686 and 688, the program then progresses to the inquiry at block 690 to determine whether or not a logon or hand shake tone has been received. In the event that such tone has not been received, then as represented at block 692, the system waits for an interval of 30 seconds to receive such a hand shake tone. This interval is represented by loop line 686. In the event that the 30 second interval has expired and no hand shake tone has been received, then as represented at block 694, the telephone system goes off hook for 10 seconds and the program proceeds as indicated at node J (FIG. 10B).

Returning to block 690, in the event the hand shake or logon tone is received, then as represented at block 696, determination is made as to whether the hand shake tone was at 1400 Hz or 2300 Hz. This is an indication of the election of a higher rate baud transmission or lower rate. Certain telephone connections will have noise problems which will require slower transmission rates. Thus, where the higher and more desirable baud rate transmission is available, the program diverts to block 698, while, the slow or 10 character per second rate is carried out as represented at block 700. At the termination of transmission, the subroutine returns in conventional manner as represented at terminal 702.

Referring to FIG. 10B, it may be observed that node J following the 10 second disconnect represented at block 694 leads to the inquiry at block 704 at which position a determination is made as to whether telephone contact with the security monitoring service has been attempted four times. In the event that it has not, then as represented by lines 706 and 708 leading to node K, the subroutine reverts to line 672 and carries out redialing. In the event that a communication attempt has been made four times, then as represented at block 710, if the transponder 8 has been programmed to dial two separate telephone numbers, then that determination is made. Where two numbers are available, then as represented at block 712, the second telephone number is set. Where two numbers are not available, then the subroutine loops as represented at line 714 to the next inquiry represented at block 716. This inquiry determines whether the second number has been used to access the security monitoring service four times. In the event that it has not, then the program returns as represented by line 708 and node K to retry as shown at FIG. 10A. In the event that the security monitoring service has not been accessed following eight attempts, then as represented at block 718 the telephone call error flag is set and, as represented at terminal 720, the subroutine returns as before.

Out Facility Number/Zone Code Subroutine

Figure 11A:
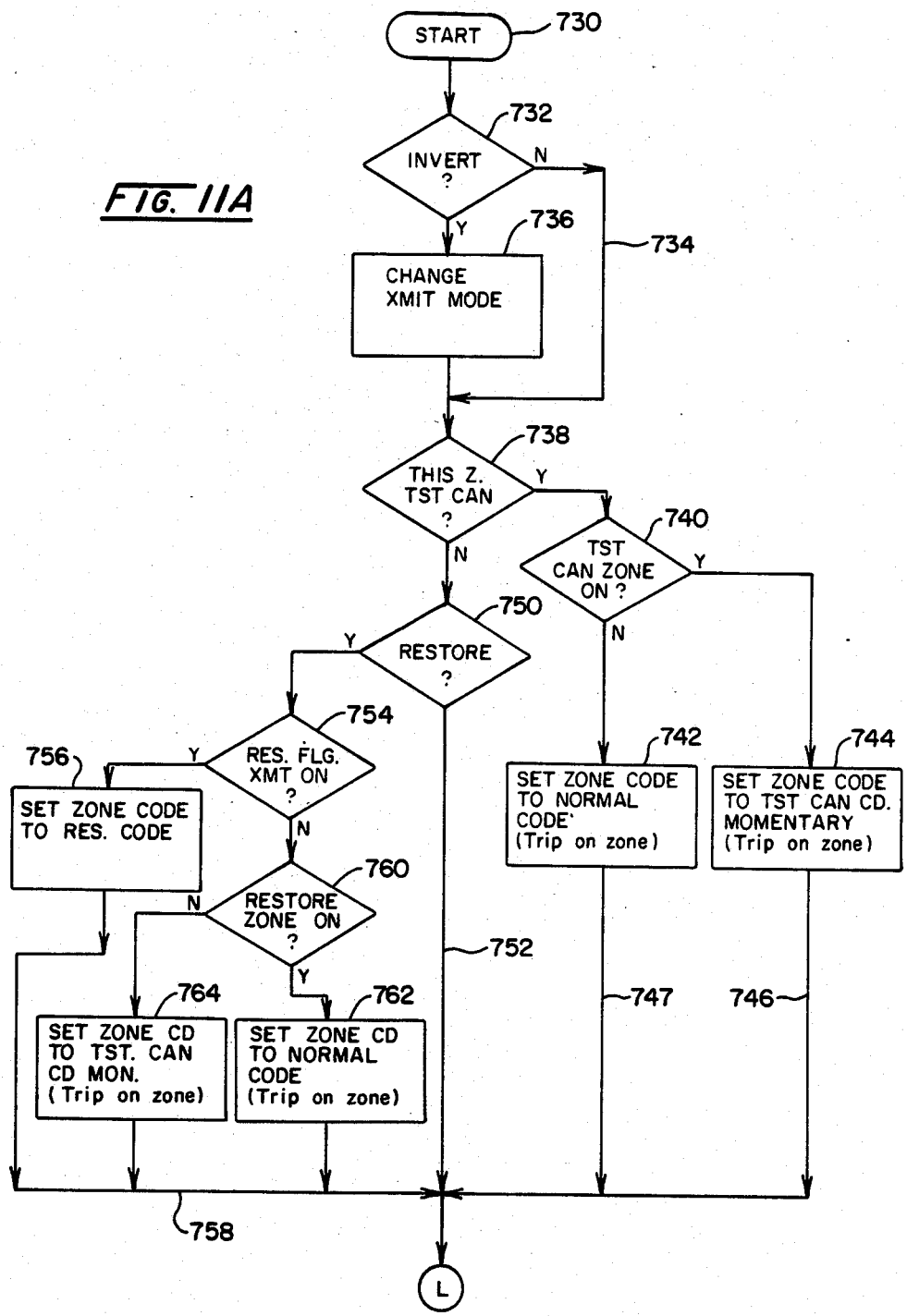

Referring to FIG. 11A, the facility or account number and zone code transmission subroutine is revealed in enhanced detail, this subroutine has been referred to in connection with block 660 in FIG. 9E.

The subroutine starts with terminal 730 which leads to an initial inquiry at block 732 wherein the question as to whether transmission should be made at a slower baud rate even though a higher 2300 Hz hand shake tone has been received. This facility permits the system to transmit at slower baud rates in a few instances within a given region where poor telephone service or the like may be at hand. Accordingly, where no such inversion is required, as represented by line 734, the program continues, whereas as represented at block 736, should the instant transponder require slower baud rate transmission, then that slower transmission mode is carried out by this program command. The subroutine then progresses to the inquiry at block 738 wherein a question is made as to whether a test cancel condition is associated with the transmission at hand. The test cancel provision is an option for the user wherein an intrusion signal can be cancelled within a predetermined length of time, for example, 15 seconds. This optional component of the program accommodates for users who have a propensity to forget that the system is armed for intrusion and very often will inadvertently trigger an intrusion alarm. Thus, the instant arrangement provides for the transmission to the security monitoring service a test cancel designated message. The test cancel message can be programmed to be associated, for example, with only one zone as for intrusion. Accordingly, the inquiry at block 738 determines whether the zone at hand is a test cancel program zone. In the event of an affirmative answer to this inquiry, the program diverts to block 740 to determine whether the test cancel zone is on. If it is not, as represented at block 742, the normal zone code, for example an intrusion zone, is set into the system. On the other hand, as represented at block 744, where the test cancel zone is on, then the zone code is set to be a test cancel code and the original zone code will have been on momentarily. The program then continues as represented by lines 746 and 747 to node L.

Returning to block 738, in the event that the zone is not a test cancel one, then the progrm continues to block 750 inquiring as to whether the zone at hand is a restore function. The restore aspect can be programmed into the system to cover the transmission of information to the security monitoring system that a zone code has been transmitted and subsequently the user has actuated the arm switch or the equivalent to re-establish the security system. For example, a small business owner may enter his business following an intrusion alarm and retore his security system by actuating the arm switch. In the event that no restore zone is present, then as represented by line 752, the subroutine continues to node L, while where a restore zone is at hand, as represented at block 754, an inquiry as made as to whether the restore flag is on. In the event that the restore flag is on, then as represented at block 756, the zone code, having already been sent, is altered to a restore code and, as represented at line 758, the subroutine progresses to node L.

Where the restore flag is determined not to be on at the inquiry at block 754, then as represented at block 760, inquiry is made as to whether the zone is programmed for a restore function. In the event of an affirmative response, as represented at block 762, the normal zone code is provided. On the other hand, as represented at block 764, where the inquiry at block 760 is in the negative, then the zone code is altered to test cancel code.

Referring to FIG. 11B, node L again is reproduced as leading to inquiry at block 766. This inquiry is to determine whether the serial transmission flag is on. In this arrangement, it may be under certain more or less diasterous situations such as a burning facility or the like that more than one zone code may be activated. As such, more than one zone code will be transmitted. In the event of an affirmative answer to the inquiry at block 766, then the subroutine sets the first code for transmission by a priority. For example, this priority may be in the order: 1-fire, 2-emergency, 3-intrusion, 4-silent hold-up, and 5-low battery. Upon setting the first priority, the subroutine proceeds to the instructions at block 770 wherein a short delay (about 500 m.s.) is experienced to permit the priority alignment. The 500 millisecond setting time is that following receipt of the acknowledgment code and prior to the commencement of actual transmission of zone code. As indicated at block 772, the account or facility number and zone code then are transmitted. Following this transmission, another dwell interval occurs as represented at block 774 (500 milliseconds) following which as represented at block 776, the account or facility number and zone code again are transmitted. Following this second transmission, the subroutine progresses to the inquiry at block 778 wherein a determination is made as to whether a transmission has been carried out a fourth time. Where the inquiry at block 778 indicates that transmission has been made four times, then the program turns off the four times transmission flag as represented at block 780, whereupon, as represented at block 782 and line 784, the setting time again is provided and the subroutine commences transmitting a next account and zone code number.

Where the inquiry at block 778 indicates that transmission four times has not been made, then as represented at block 786, the presence of a logoff or "kiss off" tone is determined. In the event no such tone is detected, then as represented at block 788, determination is made as to whether the subroutine has waited three seconds for such tone. In the event that it has not, then as represented by line 790 the subroutine loops until that three second period is up. In the event the three second wait is terminated, then as represented at block 792, an inquiry as made as to whether an attempt to communicate with the service organization in the above manner has been tried more than once. If such is the case, then as represented at terminal 794, the system goes on hook and the subroutine returns to its own commencement. In the event the communication has not been retried more than once, as represented at node M, the subroutine returns to the loop including block 782 and line 784 to again attempt to send forth the facility or account number and zone code.

In the event that a kiss off or logoff tone is recognized in consequence of the inquiry at block 786, then the subroutine progresses to node N which is seen to commence at FIG. 11C.

Referring to FIG. 11C, node N is shown leading to the inquiry at block 796 inquiring as to whether an extended format is at hand wherein the technique is provided for transmitting several items of information in the same sequence as opposed to the arrangement of sending out account number and zone code in discreet or distinct increments. In the event of an affirmative answer to the querry at block 796, then as represented at block 798, the extended code is set and, as represented at block 800, the four times transmission flag is set. The subroutine then progresses to node O which will be seen to enter the program at FIG. 11B in position for outputting information.

In the event that the querry as to extended format at block 796 results in a negative response, then as represented at block 802 a determination is made as to whether there has been a trip on the test cancel zone. In the event that there has, then as indicated at block 804, an inquiry is made as to whether the test cancel zone is on. In the event that such zone is on, or in the event that there has not been a trip in the test cancel zone as indicated at block 802, then the program progresses to the inquiry at block 808 which querries as to whether there has been a trip on the restore zone. In there event that there has been such a trip, then as represented at block 810, the inquiry as made as to whether the restore zone is on. In the event of an affirmative response, then as indicated at block 812 the restore code transmission flag is set and the program subroutine progresses as represented by lines 814 and 816.

Figure 11B:
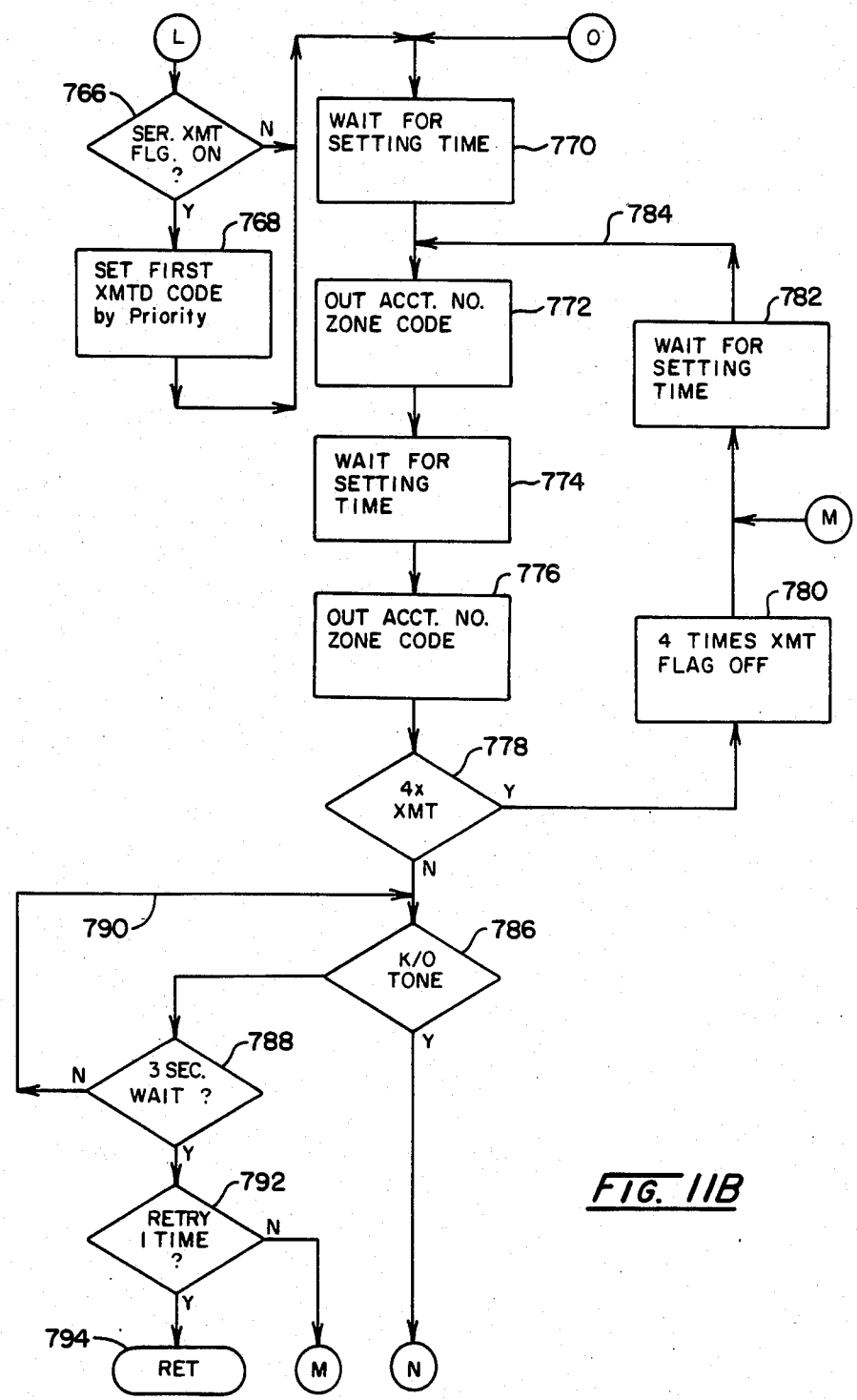

In the event the inquiry at block 810 results in a negative response, then as represented at block 818, the zone code is set to a test cancel code and, as indicated at block 820, the four times transmission flag is set, whereupon the subroutine progresses to node M as shown at FIG. 11B.

In the event the response to the inquiry at block 804 is in the negative, then as represented at block 822, the zone code is set to test cancel code and, as represented at block 824, the four times transmission flag is set and the subroutine returns to the noted node M at FIG. 11B.

Where inquiry at block 808 indicates that no trip on the restore zone is in effect, then the subroutine progresses as indicated by line 816 the inquiry at block 826 where a determination as to whether the serial flag is on. In the event that the flag is not on, as represented at block 828, the subroutine returns and in the event of an affirmative response to the serial transmission flag presence, the subroutine progresses as indicated by node P which is shown to continue with FIG. 11D. It may be recalled that the serial transmission flag indicates that more than one zone is to be transmitted.

Referring to FIG. 11D, it may be observed that node P extends to block 830 at which position in the subroutine the next transmitted code is set by priority, following which, as indicated at querry block 832, a determination is made as to whether more code is present. In the event that more code is not present, as indicated at block 834, the serial transmission flag is turned off. Where more code is present, then as represented by line 836, the serial transmission flag removal of block 834 is bypassed. The subroutine then cuts the four time transmission flag as represented in block 838 and returns to node O as shown in FIG. 11B for transmission.

Since certain changes may be made in the above-described system and apparatus without departing from the scope of the invention herein involved, it is intended that all matter contained in the description thereof or shown in the accompanying drawings shall be interpreted as illustrative and not in a limiting sense.

I claim:

1. A security apparatus and system for a facility having secure and unsecure conditions, monitoring means for sensing secure and unsecure conditions including portal monitoring means, radio frequency transmitting means within said monitoring means for transmitting unsecure conditions, a radio frequency transmission comprising a facility code unique to said facility and a zone code identifying the unsecure condition, radio frequency receiving means in a console for receiving said transmissions of unsecure conditions, a communicator network means within the console connectable with telephone service facilities for digital telephonic communication with a security monitoring service, and console comprising:

idle, pre-arm, arm, test operational modes;
 a home switch mounted on said console which is actuable in the idle operational mode to change the mode to the pre-arm mode;
 an away state switch mounted on the console which is actuable in the idle operational mode to change the operational mode to the pre-arm mode;
 an arm mode switch mounted on the console which is actuable in the pre-arm operational mode to change the mode to the armed mode;
 a test switch mounted on the console which is actuable on the idle operational mode to change the mode to the test mode;
 a home state visual indicator mounted on the console which illumates intermittantly when in the home state pre-arm mode and illuminates in a steady state when in the home state armed mode;

an away state visual indicator mounted on the console which illuminates intermittantly when in the away state pre-arm mode and illuminates in a steady state when in the home state armed mode;

a test mode visual indicator mounted on the console which illuminates when in the test operational mode;

a status visual indicator mounted on the console that illuminates in the idle operational mode when all portal monitoring means sense secure conditions;

an away state audible indicator mounted on the console which sounds intermittantly when in the away state armed mode during an exit time delay provided and sounds intermittantly during an entry time delay provided;

a logic network means to control the system, said logic means responsive to actuation of said switches and states of said modes, indicators, and switches in a manner that prompts the user through the operational sequence of the system;

whereby the system is easy to operate and a user of the system is prompted and acknowledged by the particular combination and arrangement of modes, switches and indicators.

2. The console of claim 1 comprising:

a power supply means to energize the console, said power supply means includes rectifier means connectable with an a.c. source for deriving a d.c. output, and battery means chargeable from said a.c. output for effecting said energization when said a.c. source fails;

low battery indicator means energizable to provide a visually perceptible indication of a low battery voltage condition;

low battery detect means active in response to said a.c. source failure for deriving a low battery output; and said logic network means is responsive to said low battery output for energizing said low battery indicator means and for actuating said communicator network means to effect transmission of digitally characterized signals corresponding with said facility code and zone code representing said low battery output.

3. The console of claim 2 further comprising:

emergency switch means mounted on said console and manually actuable to generate a silent emergency designated signal; and said logic network is responsive in each idle and armed operational modes to said silent emergency designated signal to actuate said communicator network means to transmit digitally characterized signals corresponding with said facility code and a zone code representing said silent emergency designated signal.

4. The console of claim 3 in which said low battery detect means includes timing network means actuable in response to said a.c. source failure for deriving said low battery output a predetermined interval from said failure.

5. The console of claim 3 further comprising:

fire indicator means mounted on said console and energizable to provide a visually perceptible indication of a fire designated unsecure condition;

intrusion indicator means mounted on said housing and energizable to provide a visually perceptible indication of an intrusion designated unsecure condition;

emergency indicator means energizable to provide a visually perceptible indication of an emergency unsecure condition;

said logic network responsive to the receipt of transmission of zone code information to energize the corresponding fire, intrusion, emergency and low battery indicator means.

6. The console of claim 5 wherein said logic network means is responsive in the test mode to inhibit said communication network means condition with respect to all unsecure signals except said silent emergency signal.

7. The console of claim 5 in which said logic network means is responsive to the occurrence within a predetermined time interval of a predetermined number of transmissions having the same said zone code unsecure condition identifications to effect the commencement of a predetermined false alarm delay interval before carrying out said actuation of said communication network means with respect to the transmissions.

8. A system providing security for a facility wherein monitorable secure and unsecure conditions including intrusion conditions are encounterable and wherein said facility includes a telephone service line extending to telephone service facilities therewithin, comprising:

transmitter means positionable in the locale of said facility, including:

sensing circuit means responsible in the presence of an unsecure condition to generate an activation signal, digital code means for selectively establishing a unique facility code correlatable with said given facility, zone code means for generating a zone code corresponding with the unsecure condition, a transmission antenna;

transmission means actuable to transmit said facility and zone code information as broadcast outputs from said antenna within the locale of the said given facility, control circuit means responsive to said zone code means and said digital code means in the presence of said activation signal for actuating said transmission means to transmit said facility code and said zone code as said broadcast outputs, transmitter power supply means for energizing said sensing circuit means, said transmission means and said control circuit means;

a security monitoring service having an access to telephone communication and including computer means responsive to digitally coded telephonic communication to provide visually readibly cognizable information corresponding to digitally coded said facility code and zone code information transmitted thereto; and transponder means having armed and idle operational modes comprising:

a housing operationally positionable within said given facility and within broadcast range of said transmitter;

communicator network means connectable with said telephone service and actuable for effecting said digital coded telephonic communication with said security monitoring service, status indicator means mounted on said housing and energizable during said idle operational mode to provide a visually perceptible indication that said transmitter is not providing said broadcast output;

home switch means mounted on said housing and actuable during said idle operational mode to derive a prearm condition;

away switch means mounted on said housing and actuable during said idle operational mode to derive a pre-arm condition;

a receiver antenna;

receiver circuit means mounted within said housing and coupled with said receiver antenna for deriving serial pulsed signal outputs in response to and corresponding with said facility and zone code information of said broadcast outputs;

arm switch means mounted on said housing and key actuable to selectively effect said armed and idle operational modes;

arm condition indicator means mounted on said housing and selectively energizable to provide a visually perceptible output representing a pre-arm prompt for carrying out arming procedures and another visible perceptible output representing said armed operational mode;

audibly perceptible means mounted within said housing and energizable to provide an audible output;

logic network means mounted within said housing,
responsive only in the absence of a said broadcast output and during said idle operational mode to energize said status indicator means, responsive when said status indicator is energized during said idle operational mode to a home switch actuation to effect energization of said arm condition indicator means to provide said perceptible output representing a said pre-arm prompt, responsive when said status indicator is energized during said idle operational mode to an away switch actuation to effect a said arm condition indicator means energization to provide a perceptible output representing a said pre-arm prompt, responsive to actuation of said arm switch means during said home switch means actuation derived perceptible output representing a pre-arm prompt to effect said armed operational mode and effect alteration of the energization of said arm condition indicator means to provide a perceptible output representing said armed operational mode, responsive to actuation of said arm switch means during said away switch means derived perceptible output representing a pre-arm prompt to commence time-out of a predetermined exit delay wherein said idle operational mode is maintained and said energization of said arm condition indicator means is altered to provide a perceptible output representing said armed operational mode and deriving said armed operational mode at the completion of said exit delay time-out, responsive to said receiver circuit means serial pulsed signal outputs for verifying the facility code information of said signal outputs and for actuating said communication network means to effect transmission of digitally characterized signals corresponding with said signal outputs by telephonic communication with said security monitoring service, said logic network means being responsive to actuate said communicator network means to transmit digitally characterized signals containing said intrusion designated unsecure condition information only during said armed operational mode, and responsive to actuation of said arm switch means in the presence of said armed operational mode to effect re-entry into said idle operational mode;

power supply means for energizing said communicator means, said status indicator means, said receiver circuit means and arm condition indicator means, said audibly perceptible means and said logic means network means;

whereby the system is easy to operate and a user of the system is prompted and acknowledged by the particular combination and arrangement of modes, switches, and indicators.

9. A security apparatus and system for a facility having monitorable secure and unsecure conditions wherein a portal transition to an open orientation represents an intrusion condition, and said facility having a telephone service line extending to telephone service facilities therewithin and communicable with a security monitoring service, comprising:

transmitter means positionable at a location in the facility and including:

sensing circuit means responsive in the presence of a particular unsecure condition to generate an activation signal;

digital code means for selectively establishing a unique facility code correlatable with said facility;

zone code means for generating a zone code corresponding to the particular unsecure condition;

a transmission antenna;

transmission means actuable to transmit R.F. coded serial data signals from said antenna within a region substantially restricted to said facility;

control circuit means responsive to said zone code means and said digital code means in the presence of said activation signal for actuating said transmission means to transmit said facility code and said zone code as said serial data signals;

transmitter power supply means for energizing said sensing circuit means, said transmission means and said control circuit means; and transponder means having idle and armed operational modes and operationally positionable within said given facility, including:

communicator network means connectable with said telephone service and actuable for effecting digital telephonic communication with said security monitoring service;

status indicator means actuable to have an output condition during said operational idle mode to provide a perceptible indication that said transmission means is not actuated in correspondence with a particular unsecure condition;

home switch means actuable during said idle operational mode to derive a pre-arm condition;

away switch means actuable during said idle operational mode to generate serial pulsed signal outputs corresponding with received serial data signals;

arm switch means actuable to select said armed or idle operational modes;

arm condition indicator means actuable to provide a perceptible output representing a pre-arm prompt for carrying out arming procedures and another perceptible output representing said armed operational mode;

test switch means manually actuable to derive the test mode;

logic network means responsive only in the absence of a said transmission by said transmitter means and during said idle operational mode to actuate said status indicator means, responsive when said status indicator is actuated during said idle operational mode to a home switch actuation to actuate said arm condition indicator means to provide said perceptible output representing a pre-arm prompt, responsive when said status indicator is actuated during said idle mode to an away switch actuation to actuate said arm condition indicator means to provide said perceptible output representing a pre-arm prompt, responsive to actuation of said arm switch means during said home switch means actuation derived perceptible output representing a pre-arm prompt to effect said armed operational mode, responsive to actuation of said arm switch means during said away switch means derived perceptible output representing a pre-arm prompt to commence time-out of a predetermined exit delay wherein said idle operational mode is maintained and deriving said armed mode at the completion of said delay time-out, responsive to the said receiver circuit means serial pulsed signal outputs corresponding with an intrusion condition only during said armed operational mode for actuating said communicator network means to effect transmission of digitally characterized signals corresponding therewith by telephonic communication with said security monitoring service, responsive to said receiver circuit means serial pulsed signal outputs corresponding with said unsecure conditions during both of said idle and armed operational modes for actuating said communicator network means to effect transmission of digitally characterized signals corresponding therewith by telephonic communication with said security monitoring service, responsive to actuation of said arm switch means in the presence of said armed operational mode to effect re-entry into said idle operational mode and responsive to said test switch actuation only in the idle operational mode to effect entry into said test mode to inhibit said communicator newwork means communication; and transponder power supply means for energizing said communicator network means, said status indicator means, said receiver circuit means, said arm condition indicator means, and said logic network means.

10. The system of claim 9 in which:
said transmitter means sensing circuit means is a switch, hand actuable to generate said activation signal; and
said zone code means generates a zone code representation of a said unsecure condition corresponding with a personal emergency condition; and
said transponder means logic network means is responsive both in said idle and armed modes to said receiver circuit means pulsed signal outputs corresponding with serial data signals representing said personal emergency condition to effect said actuation of said communicator network means.

11. The system of claim 9 in which:
said transmitter means sensing circuit means is a switch, hand actuable to generate a said activation signal; and
said zone code means generates said zone code representative of an arm switch actuation; and
said transponder means logic network means is responsive in said armed mode to said receiver circuit means pulsed signal outputs corresponding with serial data signals representing said arm switch actuation to effect re-entry into said idle operational mode.

12. The system of claim 9 in which said transponder means includes:
silent emergency switch means manually actuable to generate a silent emergency designated signal;
said logic network means is responsive to said silent emergency designated signal in each said idle and armed operational modes to actuate said communicator network means to transmit said digitally characterized signals corresponding with said facility code and a zone code representing said silent emergency designated signal.

13. The system of claim 9 in which:
said transmitter power supply means is a replaceable battery having acceptable voltage outputs above a predetermined threshold level;
said control circuit means includes detector circuit means responsive to said battery voltage outputs and having a low battery output condition when said outputs are below said predetermined threshold level;
said zone code means derives a zone code corresponding with said low battery output condition; and
said control circuit means is responsive to said low battery output condition zone code and said digital code means for actuating said transmission means to transmit said facility code and said zone code corresponding with said low battery output condition as said serial data signals.

14. The system of claim 13 in which said transmitter means includes a selectively energizable perceptible indicator; and
said control circuit means is responsive to said low battery output condition to energize said perceptible indicator.

15. The system of claim 13 in which said tranponder means logic network means is responsive to said receiver circuit means serial pulsed signal outputs corresponding with said serial data signals representing said facility code and said zone code corresponding with said low battery condition when in said armed and idle operational modes to actuate said communicator network means to effect transmission of said digitally characterized signals corresponding with said serial pulsed signal outputs.

16. The system of claim 15 in which:
said transponder power supply means includes rectifier means connectable with an a.c. source for generating a d.c. output, and battery means chargeable from said d.c. output for providing said energization when said a.c. source fails;
said transponder means includes timing network means actuable in response to said a.c. source failure for generating a low battery output a pre-determined interval from said failure; and
said logic network means is responsive to said low battery output for actuating said communicator means to transmit said digitally characterized signals corresponding with said facility code and zone code representing said low battery output.

17. The system of claim 9 in which said logic network means is responsive to the occurrence within a predetermined time interval of a predetermined number of transmission means, said transmissions of said coded serial data signals each incorporating the same said zone code, to commence a predetermined false alarm delay interval before carrying out said actuation of said communicator network means with respect to such coded serial data signals.

18. The system of claim 16 in which said transponder means includes:

first indicator means energizable to provide a visual perceptible indication of a fire designated unsecure condition;

intrusion indicator means energizable to provide a visually perceptible indication of an intrusion designated unsecure condition;

emergency indicator means energizable to provide a visually perceptible indication of an emergency unsecure condition;

low battery indicator means energizable to provide a visually perceptible indication of a low battery voltage level unsecure condition;

audibly perceptible means energizable to provide an audible output;

said logic network means is responsive to said receiver circuit means serial pulsed signal outputs to effect energization of select ones of said fire indicator means, intrusion indicator means, emergency indicator means and low battery indicator means, said energization selection corresponding with zone code components of said coded serial data signals from which said serial pulsed signal outputs are derived, said logic network means effecting the energization of said audibly perceptible means in correspondence with a unique sound output pattern simultaneously with the said energization of a select said indicator means.

19. The system of claim 18 in which:

said arm condition indicator means comprises a visually perceptible home indicator energizable intermittently to provide said pre-arm prompt and in a steady-state fashion to indicate said armed operational mode condition, and a visually perceptible away indicator energizable intermittently to provide said pre-arm prompt and during said predetermined delay, said away indicator being energizable in steady-state fashion to indicate said armed opertional mode condition; and said logic network means effects intermittent energization of said home indicator for a predetermined interval during said idle operational mode in response to actuation of said home switch means and effects steady-state energization thereof in response to said arm switch means actuation during said home indicator intermittent energization, said logic network means effecting intermittent energization of said away indicator for a predetermined interval during said idle operational mode in response to actuation of said away switch and effecting steady-state energization thereof in response to said arm switch actuation during said away indicator intermittent energization, said logic network means energizing said audibly perceptible means intermittently during said exit delay.

* * * * *